US009887909B2

(12) United States Patent
Guttman et al.

(10) Patent No.: US 9,887,909 B2
(45) Date of Patent: Feb. 6, 2018

(54) NETWORK ELEMENTS, INTEGRATED CIRCUITS AND METHODS FOR ROUTING CONTROL

(75) Inventors: Erik Guttman, Waibstadt (DE); Haris Zisimopoulos, London (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 13/391,576

(22) PCT Filed: Aug. 16, 2010

(86) PCT No.: PCT/KR2010/005377
§ 371 (c)(1),
(2), (4) Date: Feb. 21, 2012

(87) PCT Pub. No.: WO2011/021815
PCT Pub. Date: Feb. 24, 2011

(65) Prior Publication Data
US 2012/0151030 A1 Jun. 14, 2012

(30) Foreign Application Priority Data

Aug. 21, 2009 (GB) .................................. 0914711.7

(51) Int. Cl.
*G06F 15/173* (2006.01)
*H04L 12/707* (2013.01)
(Continued)

(52) U.S. Cl.
CPC .............. *H04L 45/24* (2013.01); *H04L 12/56* (2013.01); *H04L 41/0213* (2013.01); *H04L 47/10* (2013.01); *H04W 40/02* (2013.01)

(58) Field of Classification Search
CPC ........ H04W 40/02; H04L 45/24; H04L 45/25; H04L 41/0213
(Continued)

(56) References Cited

U.S. PATENT DOCUMENTS 6,469,998 B1    10/2002   Burgaleta Salinas et al.
6,628,649 B1 *   9/2003   Raj et al. ...................... 370/360
(Continued)

FOREIGN PATENT DOCUMENTS

CN    1515122 A    7/2004
CN    1960302 A    5/2007
(Continued)

OTHER PUBLICATIONS

Hietalahti et al. (3GPP Core Network migration path for HSPA+ and LTE "http://www.3gpp.org/ftp/information/presentations/presentations_2010/2010_05_Moscow/Core_Network_Hietalahti.pdf").*
(Continued)

*Primary Examiner* — Razu A Miah
(74) *Attorney, Agent, or Firm* — Jefferson IP Law, LLP

(57) ABSTRACT

A method for identifying whether a selective internet protocol transport opportunity (SIPTO) route is allowed to be used by at least one wireless communication unit comprises, at a core network element: storing subscription profile data associated with the at least one wireless communication unit in a home subscriber server (HSS) database, where the subscription profile data comprises an indication of whether the wireless communication unit has access rights to use a SIPTO route, and generating a SIPTO indicator for informing at least one network element that the at least one wireless communication unit is allowed to use the SIPTO route.

12 Claims, 17 Drawing Sheets

(51) Int. Cl.
*H04L 12/24* (2006.01)
*H04L 12/801* (2013.01)
*H04W 40/02* (2009.01)
*H04L 12/54* (2013.01)

(58) Field of Classification Search
USPC .............................................. 709/223
See application file for complete search history.

(56) References Cited

U.S. PATENT DOCUMENTS

| | | | | |
|---|---|---|---|---|
| 7,702,732 | B1* | 4/2010 | Squire | H04L 41/084 709/206 |
| 8,170,534 | B2* | 5/2012 | Naqvi | H04W 72/048 370/259 |
| 2003/0156536 | A1* | 8/2003 | Oki et al. | 370/229 |
| 2004/0004967 | A1* | 1/2004 | Nakatsugawa | H04L 29/12311 370/400 |
| 2004/0117339 | A1* | 6/2004 | Thubert | H04L 29/06 |
| 2004/0122954 | A1* | 6/2004 | Shaheen | H04W 36/0011 709/227 |
| 2004/0258064 | A1* | 12/2004 | Nakamura et al. | 370/389 |
| 2005/0117590 | A1* | 6/2005 | Ronneke | 370/395.52 |
| 2005/0180426 | A1* | 8/2005 | Sakata | H04L 47/10 370/395.2 |
| 2005/0249121 | A1* | 11/2005 | Matsunaga | 370/238 |
| 2005/0249194 | A1* | 11/2005 | Sahaya et al. | 370/352 |
| 2005/0271014 | A1* | 12/2005 | Gillies | H04W 36/10 370/331 |
| 2005/0276232 | A1* | 12/2005 | Ito | H04L 12/4675 370/254 |
| 2006/0092901 | A1* | 5/2006 | Parantainen | 370/342 |
| 2006/0092941 | A1* | 5/2006 | Kusama | H04L 43/02 370/392 |
| 2006/0140177 | A1* | 6/2006 | Karhu | H04L 29/06 370/356 |
| 2006/0233100 | A1* | 10/2006 | Luft | H04L 41/0896 370/229 |
| 2006/0233101 | A1* | 10/2006 | Luft | H04L 41/0896 370/229 |
| 2006/0294245 | A1* | 12/2006 | Raguparan | H04L 29/06027 709/227 |
| 2007/0036151 | A1* | 2/2007 | Baeder | H04L 29/06027 370/352 |
| 2007/0189152 | A1* | 8/2007 | Tamura et al. | 370/216 |
| 2007/0268855 | A1 | 11/2007 | Grayson et al. | |
| 2008/0052387 | A1* | 2/2008 | Heinz et al. | 709/223 |
| 2008/0205326 | A1* | 8/2008 | Caradec | 370/328 |
| 2008/0240040 | A1 | 10/2008 | Faccin | |
| 2008/0254833 | A1* | 10/2008 | Keevill | H04L 12/5692 455/558 |
| 2008/0267153 | A1* | 10/2008 | Mukherjee | H04L 63/104 370/338 |
| 2009/0073995 | A1 | 3/2009 | Pandey et al. | |
| 2009/0190550 | A1* | 7/2009 | Giustina | H04L 12/5692 370/331 |
| 2009/0232015 | A1* | 9/2009 | Domschitz | H04L 12/5695 370/252 |
| 2009/0238159 | A1* | 9/2009 | Takano | H04L 45/124 370/338 |
| 2009/0265453 | A1* | 10/2009 | Hirano | H04L 12/24 709/223 |
| 2009/0268703 | A1* | 10/2009 | Furumi | 370/342 |
| 2010/0208658 | A1 | 8/2010 | Vesterinen | |
| 2010/0234023 | A1 | 9/2010 | Bae et al. | |
| 2010/0272063 | A1 | 10/2010 | Kato et al. | |
| 2010/0279733 | A1* | 11/2010 | Karsten et al. | 455/552.1 |
| 2010/0293284 | A1* | 11/2010 | Song et al. | 709/230 |
| 2011/0013631 | A1* | 1/2011 | Frydman et al. | 370/390 |
| 2011/0026463 | A1 | 2/2011 | Lair | |
| 2011/0106959 | A1* | 5/2011 | Suciu | H04W 36/0011 709/230 |
| 2011/0116469 | A1* | 5/2011 | Bi et al. | 370/331 |
| 2011/0124588 | A1 | 5/2011 | Jeschke et al. | |
| 2011/0176531 | A1 | 7/2011 | Rune et al. | |
| 2011/0225319 | A1* | 9/2011 | Aso et al. | 709/238 |
| 2011/0235546 | A1* | 9/2011 | Horn et al. | 370/254 |
| 2011/0286384 | A1 | 11/2011 | Sugimoto et al. | |
| 2011/0296125 | A1* | 12/2011 | Shaikh | G06F 21/30 711/159 |
| 2012/0002608 | A1 | 1/2012 | Vesterinen et al. | |
| 2012/0026933 | A1* | 2/2012 | Aso et al. | 370/315 |
| 2012/0039304 | A1 | 2/2012 | Kim et al. | |
| 2012/0110197 | A1* | 5/2012 | Miklos et al. | 709/228 |
| 2012/0142278 | A1* | 6/2012 | Wang et al. | 455/68 |
| 2012/0188895 | A1* | 7/2012 | Punz | H04W 76/022 370/252 |
| 2012/0269162 | A1 | 10/2012 | Vesterinen et al. | |

FOREIGN PATENT DOCUMENTS

| | | |
|---|---|---|
| CN | 101091335 A | 12/2007 |
| CN | 101273656 A | 9/2008 |
| CN | 101388845 A | 3/2009 |
| EP | 2 037 639 A2 | 3/2009 |
| EP | 2 104 379 A1 | 9/2009 |
| EP | 2 407 004 A1 | 9/2010 |
| EP | 2 332 355 A1 | 6/2011 |
| EP | 2 406 987 A2 | 2/2012 |
| EP | 2 428 059 A2 | 3/2012 |
| JP | 2010-523053 A | 7/2010 |
| JP | 2011-519881 A | 7/2011 |
| RU | 2006 147 008 A | 7/2008 |
| WO | 2006/067479 A1 | 7/2006 |
| WO | 2007-046210 A1 | 4/2007 |
| WO | 2007/139641 A2 | 12/2007 |
| WO | 2008-049870 A2 | 5/2008 |
| WO | 2008/121370 A1 | 10/2008 |
| WO | 2008/125729 A1 | 10/2008 |
| WO | 2009-020284 A1 | 2/2009 |
| WO | 2009/024182 A1 | 2/2009 |
| WO | 2009/034071 A2 | 3/2009 |
| WO | 2009-038449 A2 | 3/2009 |
| WO | 2009/038449 A3 | 6/2009 |
| WO | 2009/070061 A1 | 6/2009 |
| WO | 2010/039085 A1 | 4/2010 |
| WO | 2010/067569 A1 | 6/2010 |
| WO | 2010/102652 A1 | 9/2010 |
| WO | 2010/104351 A2 | 9/2010 |
| WO | 2010/128773 A2 | 11/2010 |

OTHER PUBLICATIONS

Schneider et al. (Design and implementation of an offload engine for internet group messaging protocol multicast snooping; The institution of engineering and technology 2008, vol. 2, No. 3, pp. 484-492).*

Wang et al. (Study on Enhanced Strategies for TCP/IP Offload Engines; Proceedings of the 2005 11th International Conference on Parallel and Distributed Systems (ICPADS'05).*

Vodafone et al., 3GPP TSG-SA WG1 Meeting #47 S1-093338, Update to the SA2 WID for Local IP Access & Internet Offload, Aug. 10, 2009.

Vodafone, 3GPP TSG-SA WG1 Meeting #47 S1-093342, Definition for Local IP Access and Selected IP Traffic Offload, Aug. 10, 2009.

Vodafone, 3G Macro and HNB-GW non-S4 local breakout using GGSN allocation, 3GPP TSG SA WG2 Meeting #74, TD S2-094576, Jul. 10, 2009, Sophia Antipolis, France.

3GPP TS 22.220 V9.1.1, 3rd Generation Partnership Project; Technical Specification Group Services and System Aspects; Service requirements for Home NodeBs and Home eNodeBs (Release 9); Section 5.9, Jun. 2009.

3GPP Draft, S1-093338, 3GPP TSG-SA WG1 Meeting #47, Rome, Italy, Aug. 3-7, 2009.

3GPP Draft, S1-093134, proposed CR to 22.101, 3GPP TSG-SA WG1 Meeting #47, Rome, Italy, Aug. 3-7, 2009.

Alcatel-Lucent, On HNB and HeNB interfaces for LIPA, 3GPP TSG-SA WG2 #73, 3GPP, May 15, 2009, S2-093378, Tallinn, Estonia.

(56) References Cited

OTHER PUBLICATIONS

Huawei, Mobility Mode Selection, 3GPP Draft, S2-071694, 3rd Generation Partnership Project (3GPP), Mobile Competence Centre; 650, Route Des Lucioles, F-06921, Sophia-Antipolis Cedex, France, vol. SA WG2, Beijing, China, Apr. 18, 2007, XP050259461.

* cited by examiner

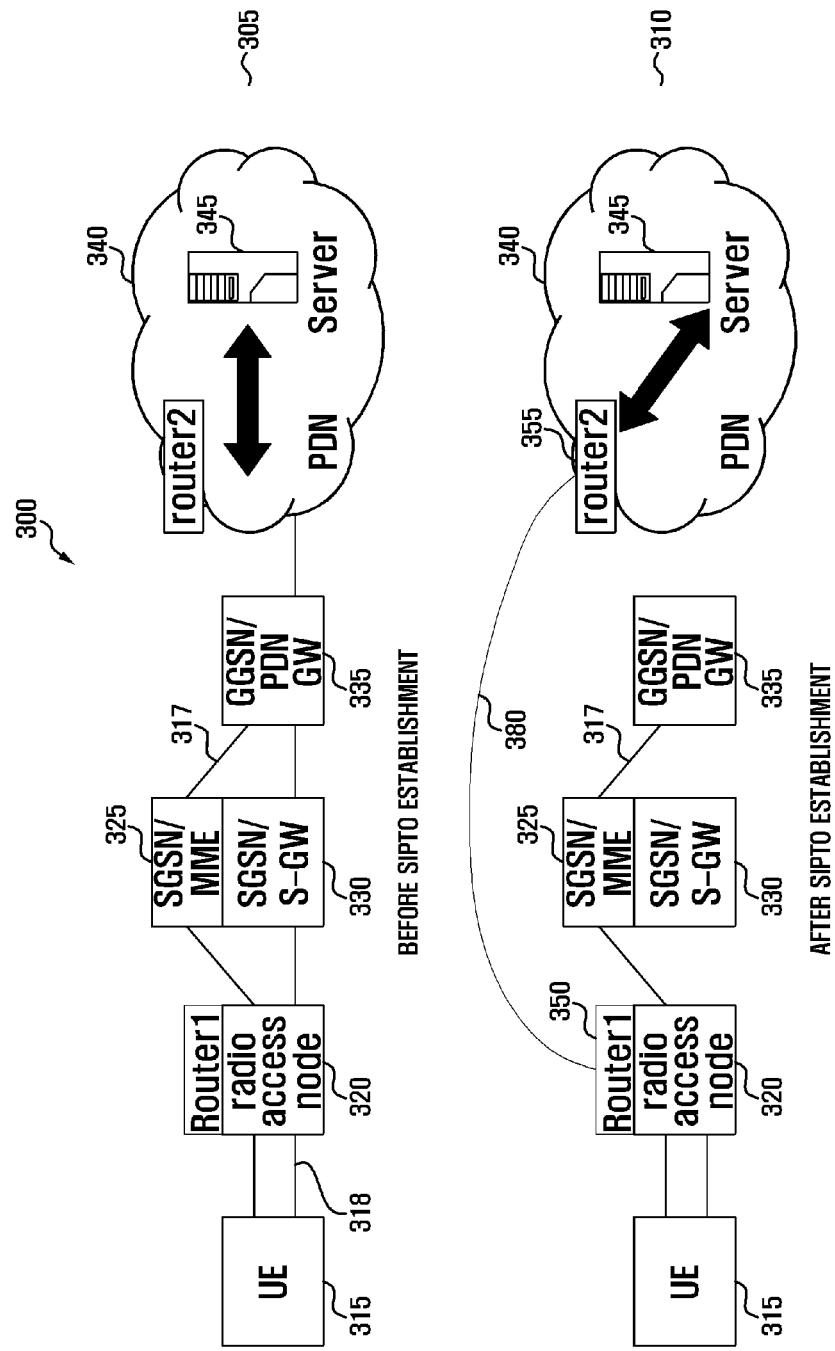
[Fig. 3]

[Fig. 4]
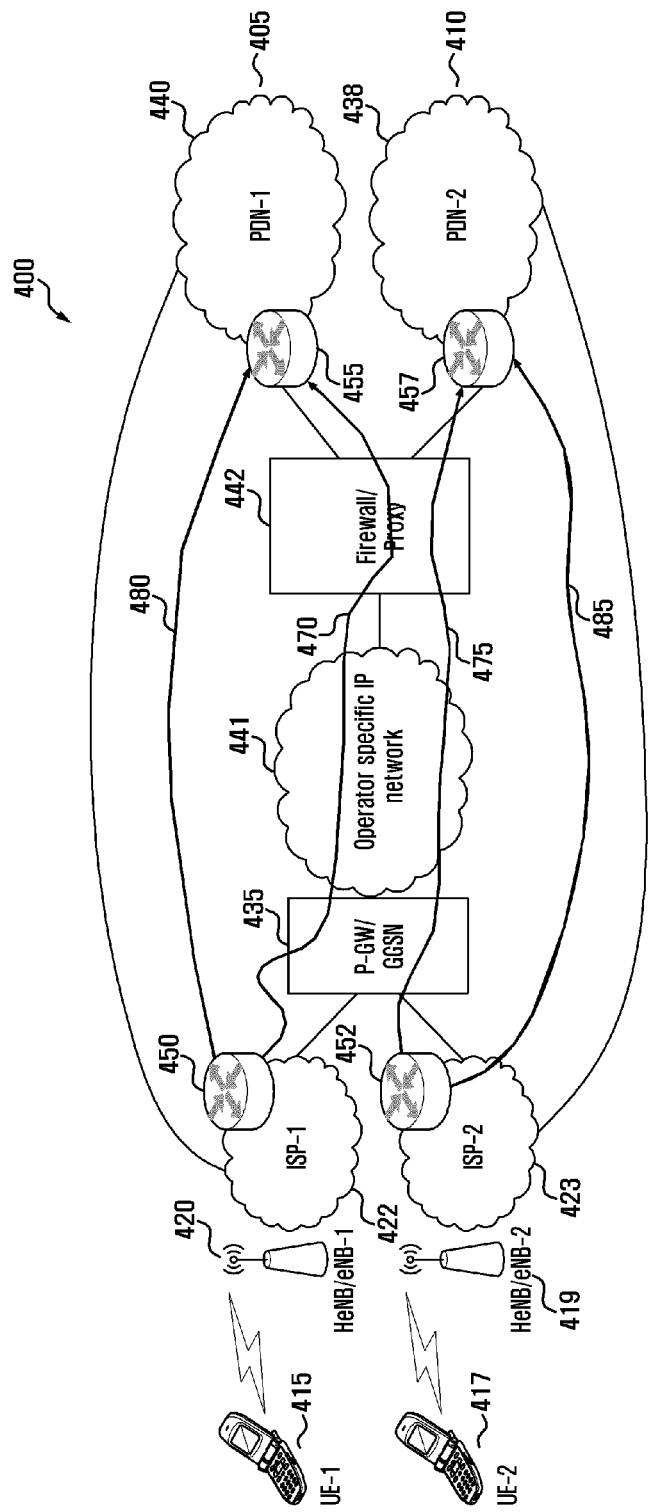

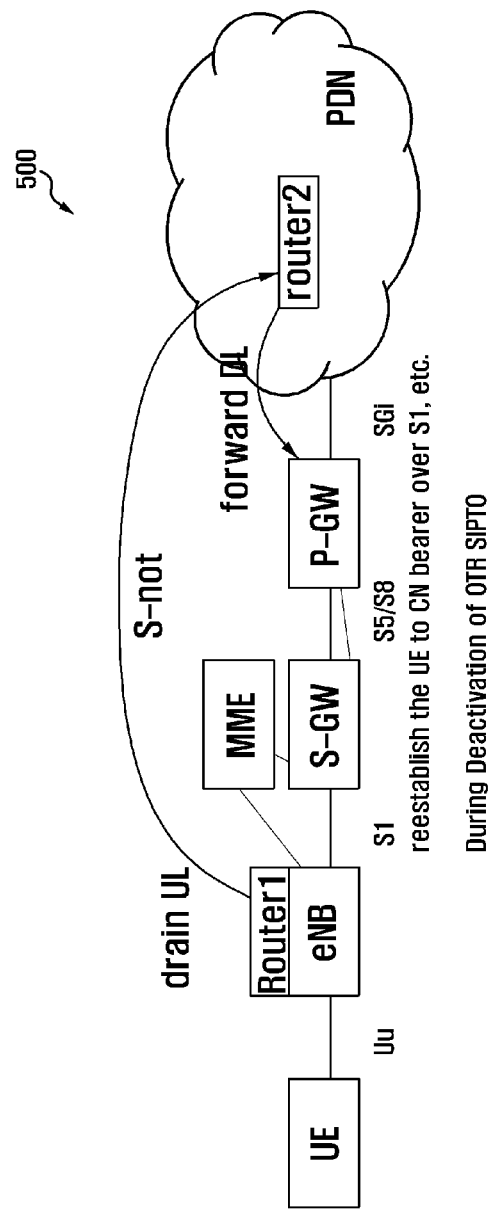

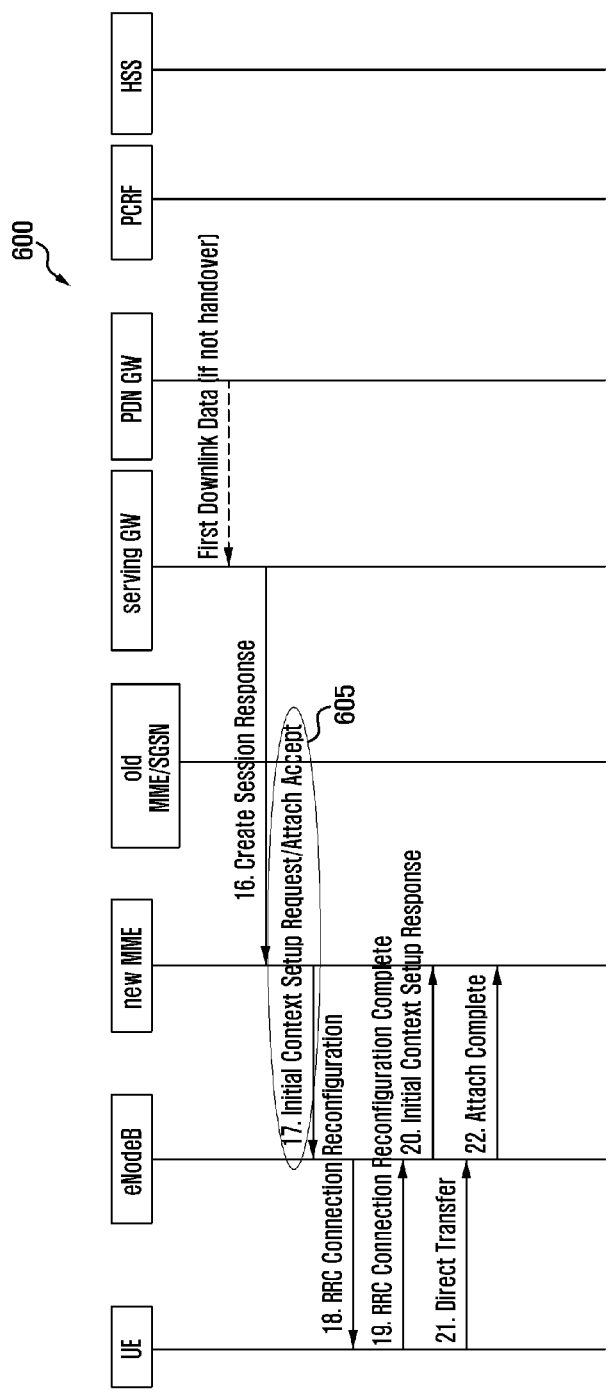
[Fig. 6]

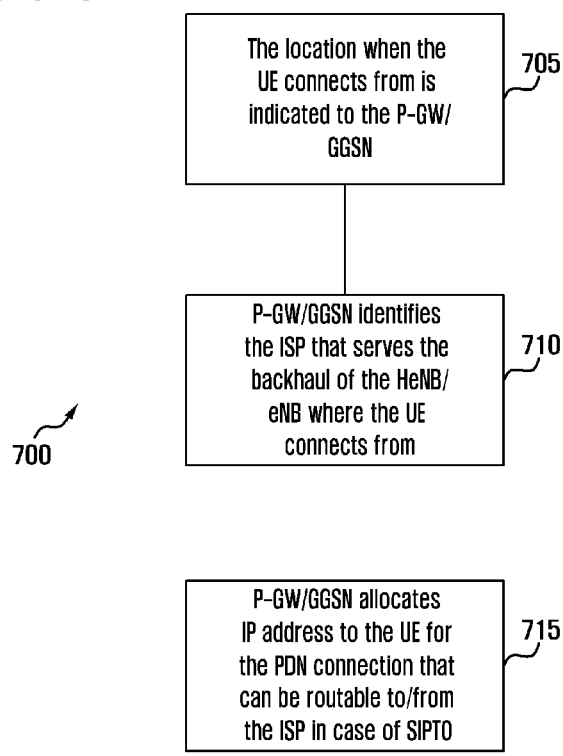
[Fig. 7]

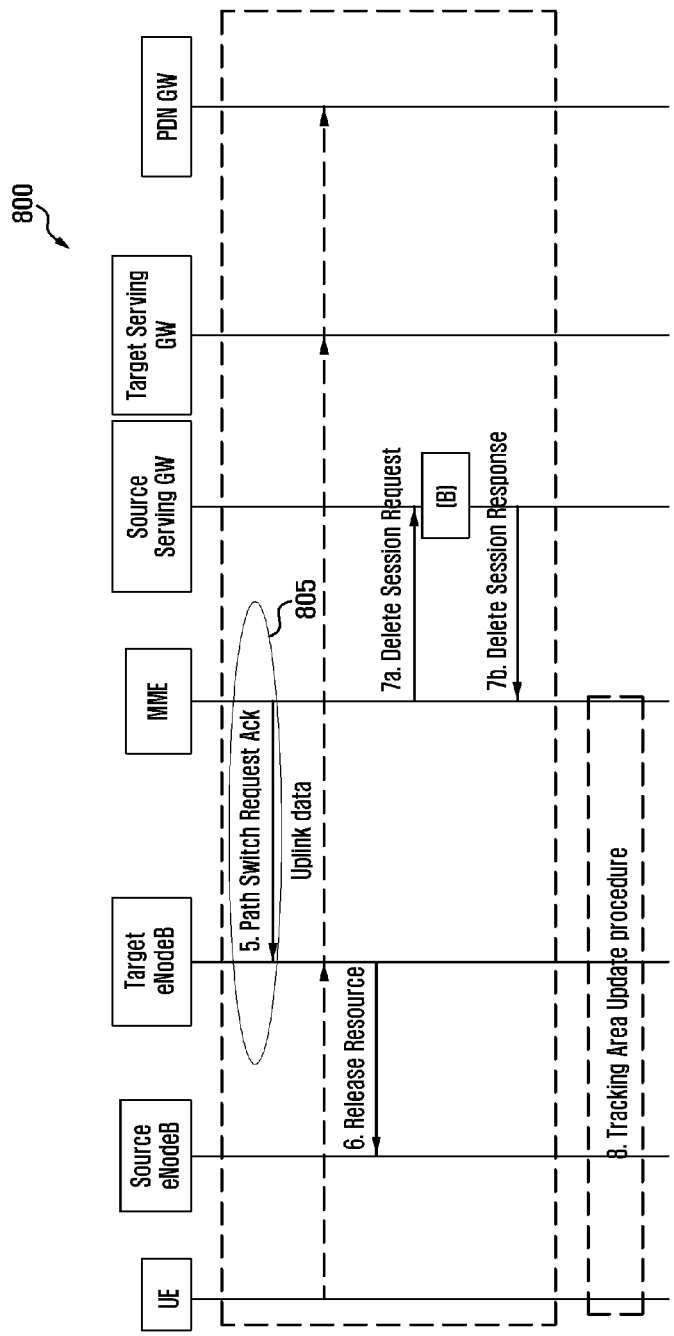

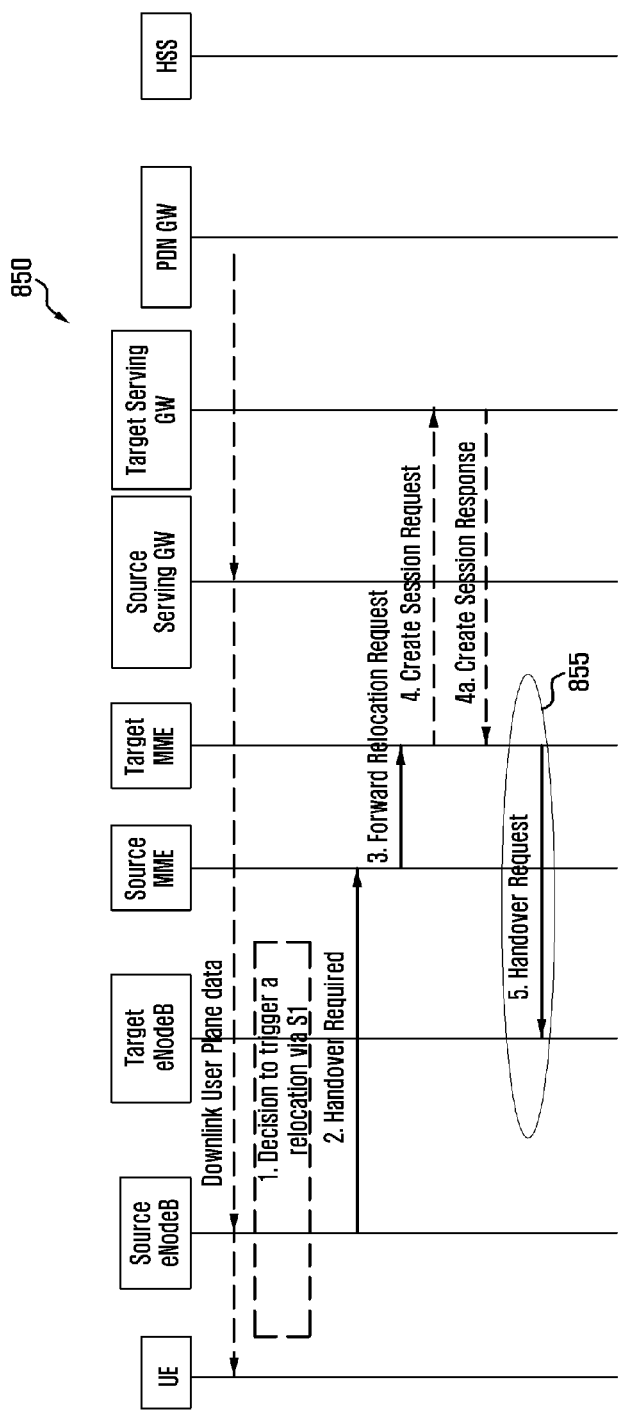

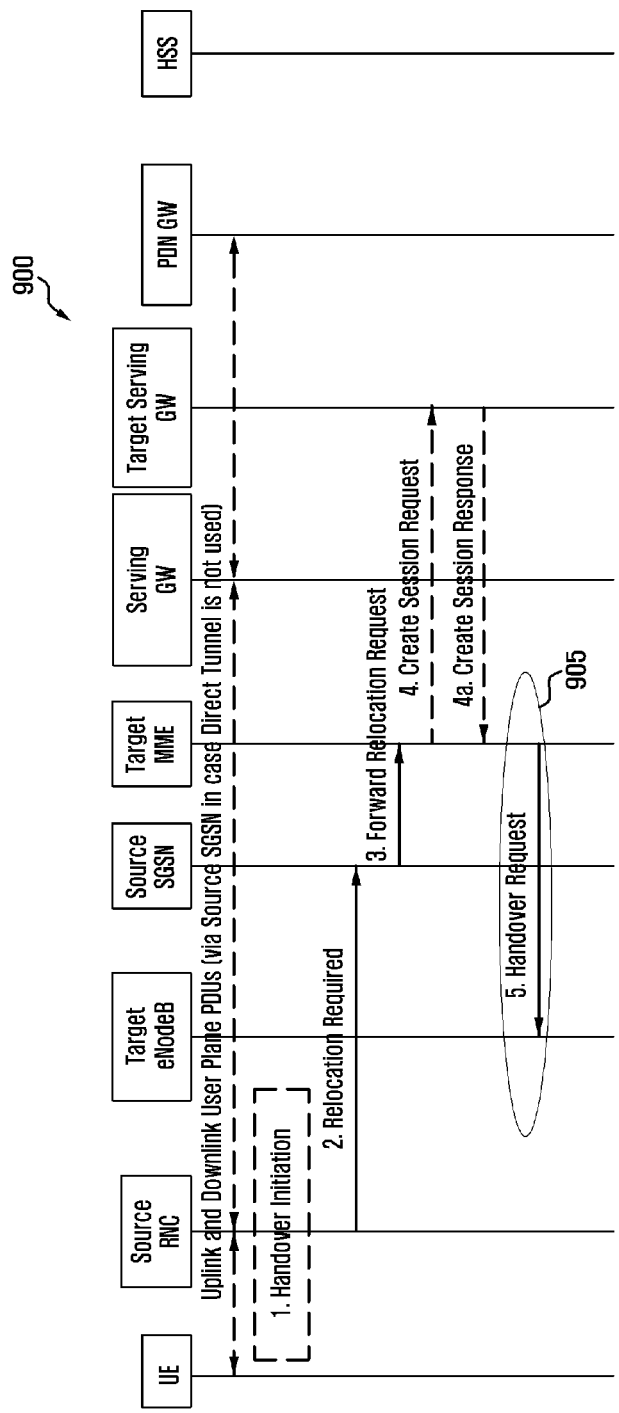
[Fig. 10]

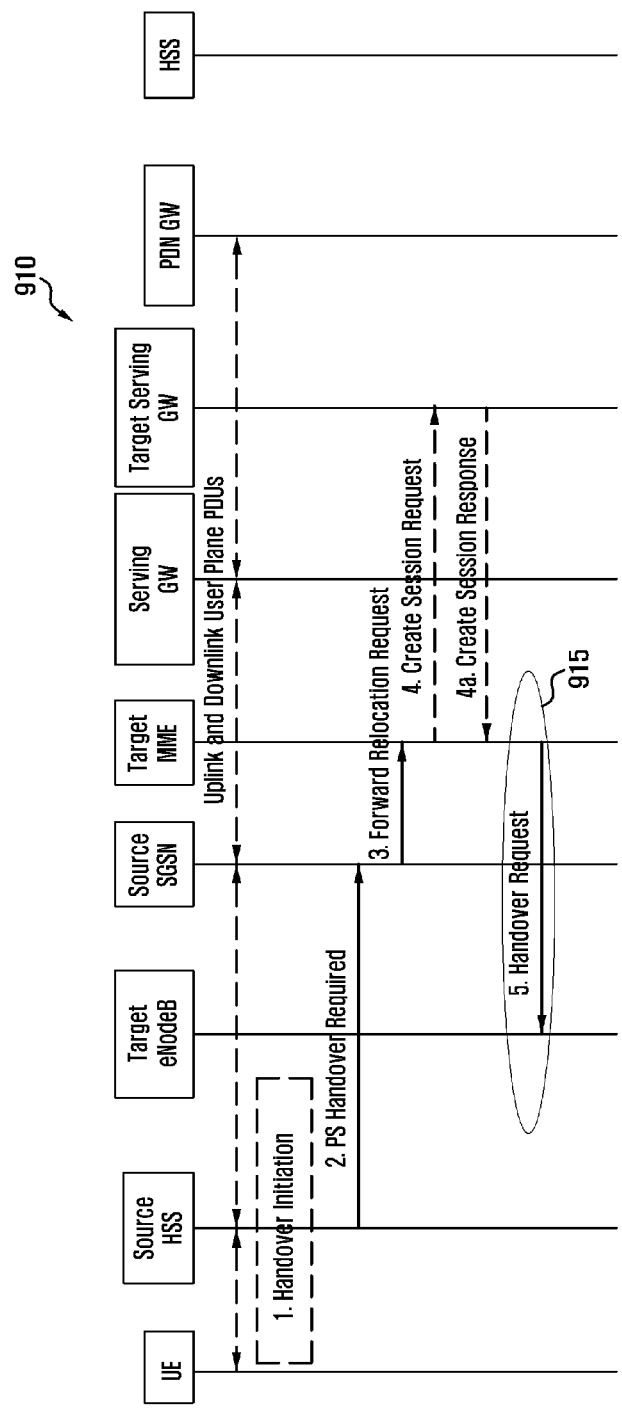
[Fig. 11]

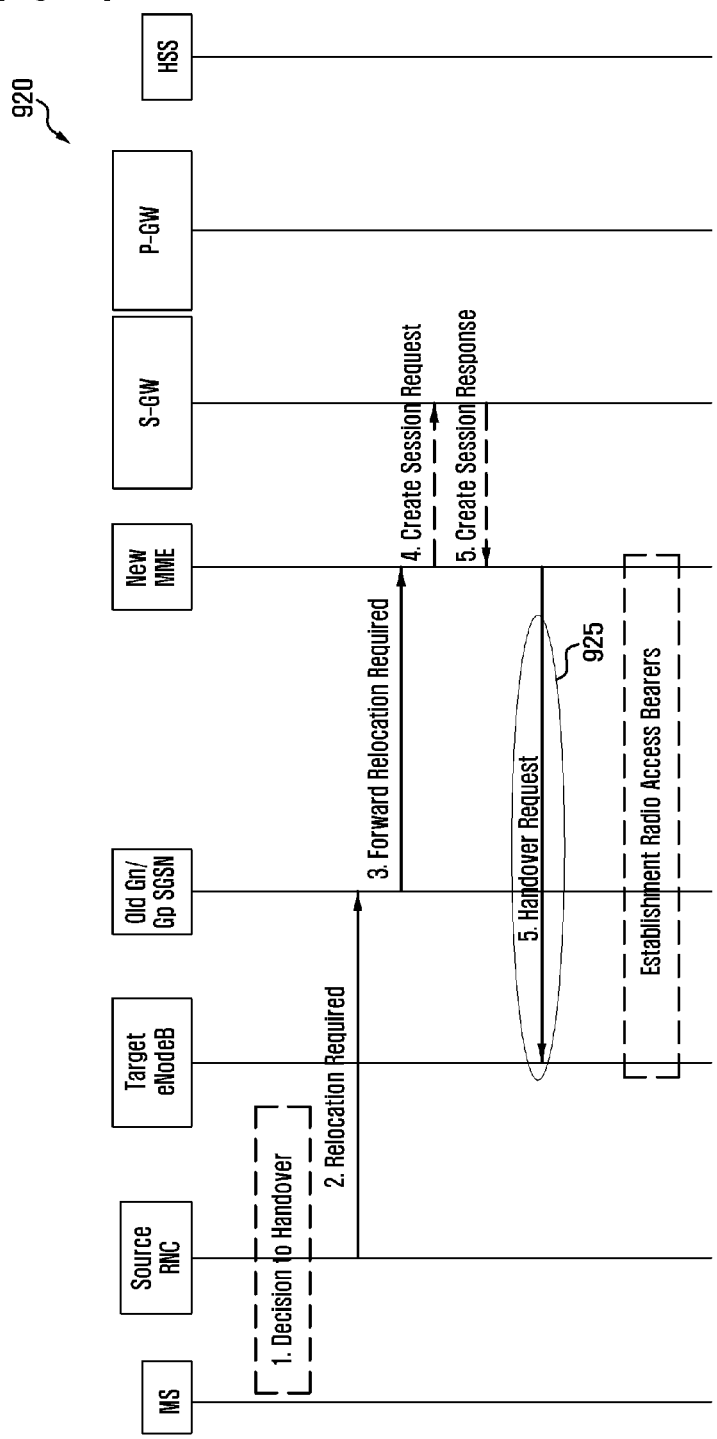
[Fig. 12]

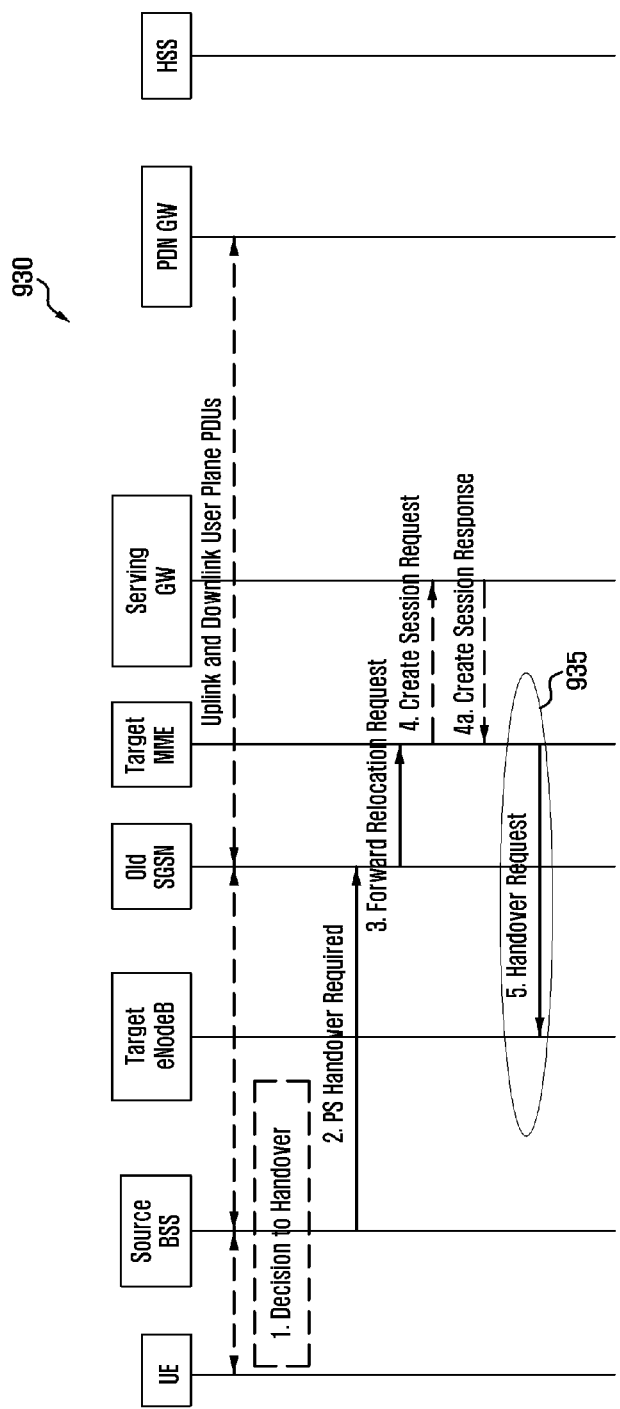
[Fig. 13]

[Fig. 14]
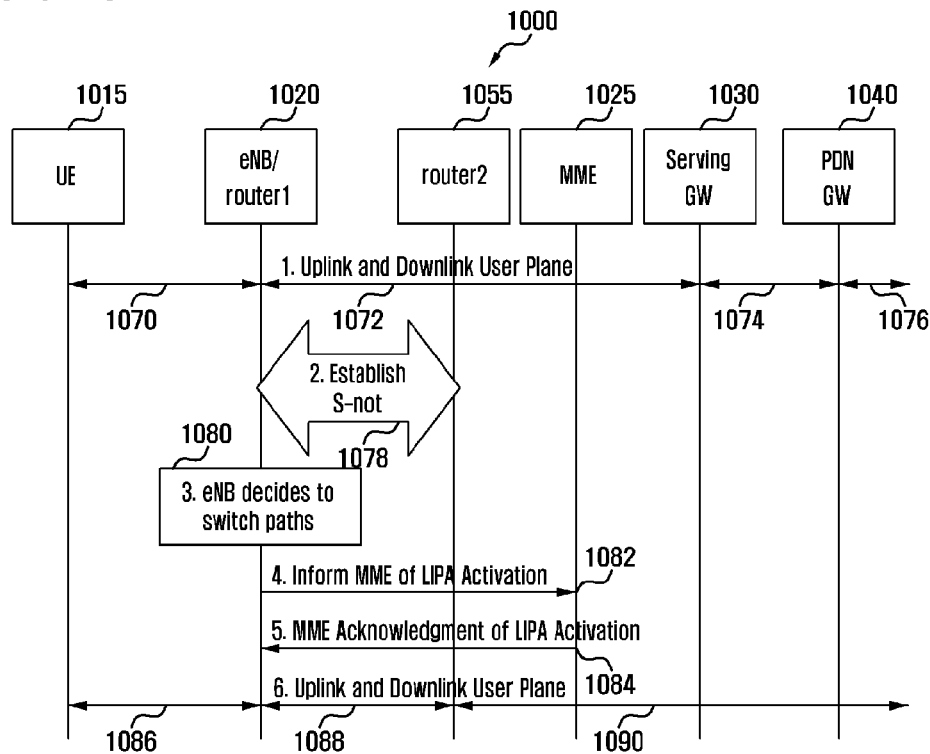
[Fig. 15]
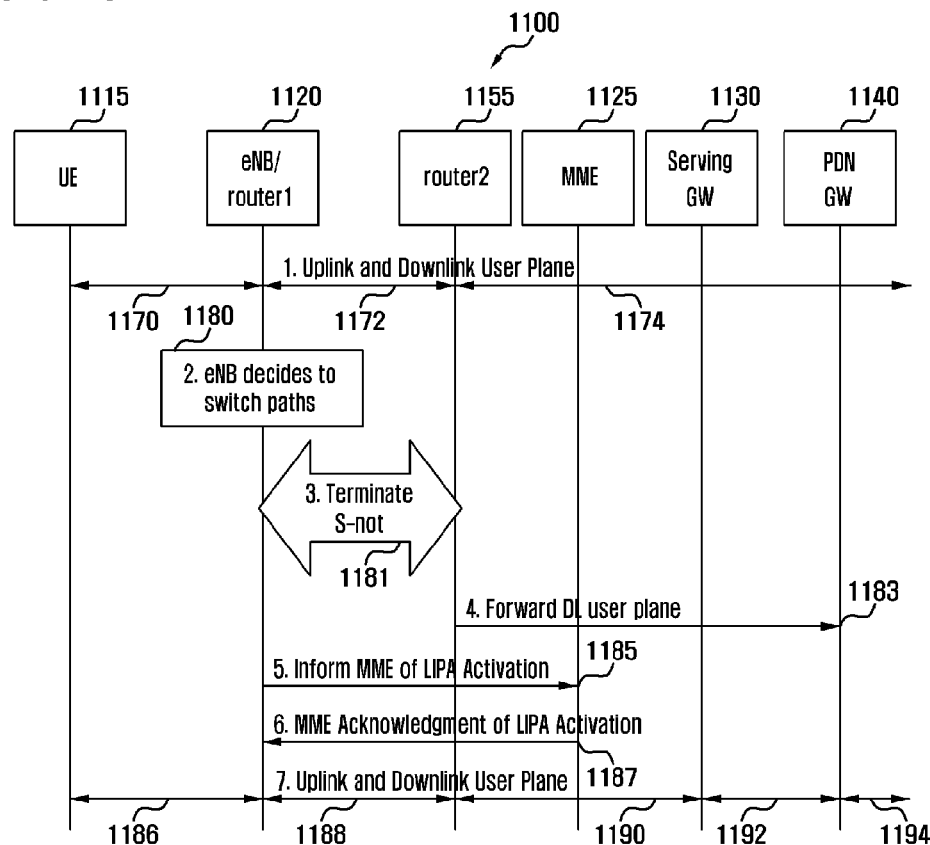

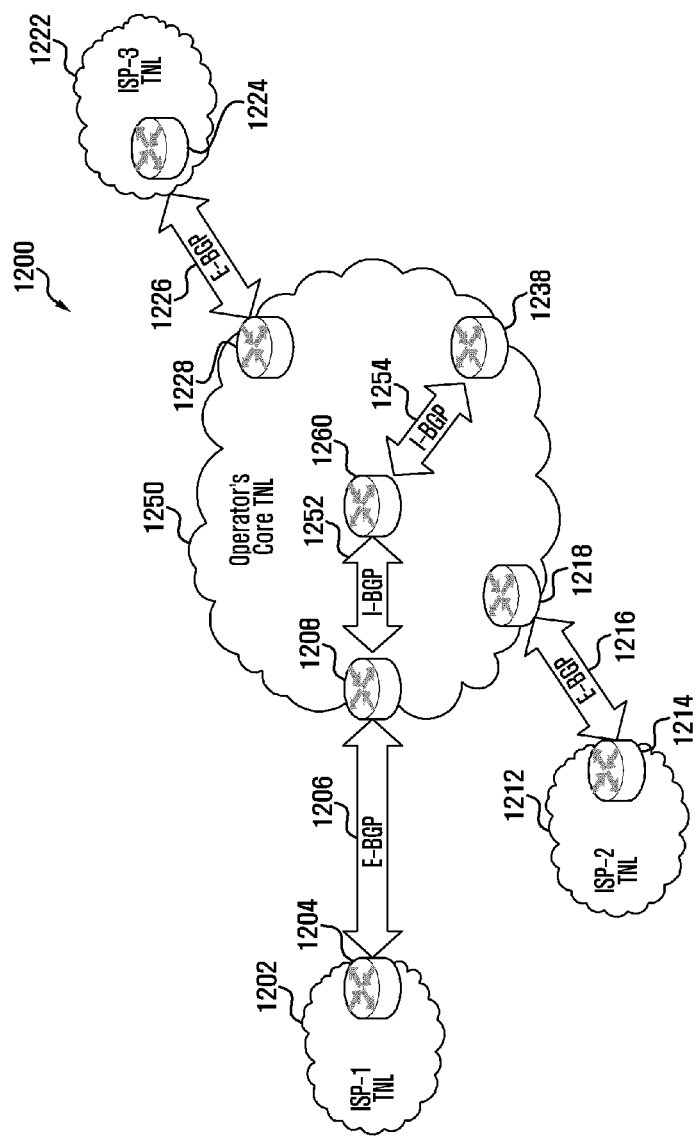
[Fig. 16]

[Fig. 17]
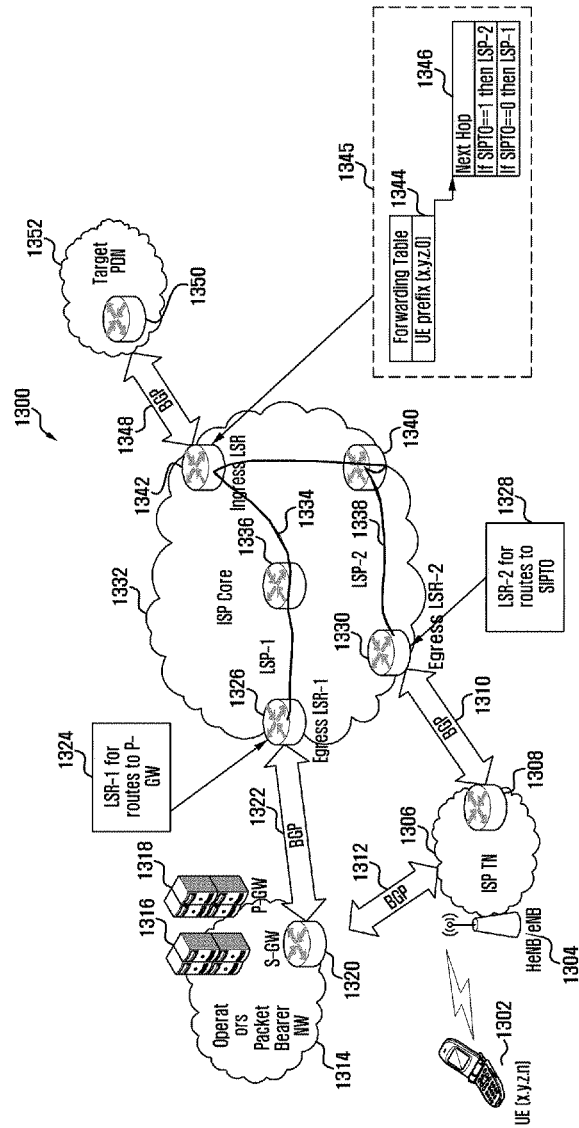

[Fig. 18]
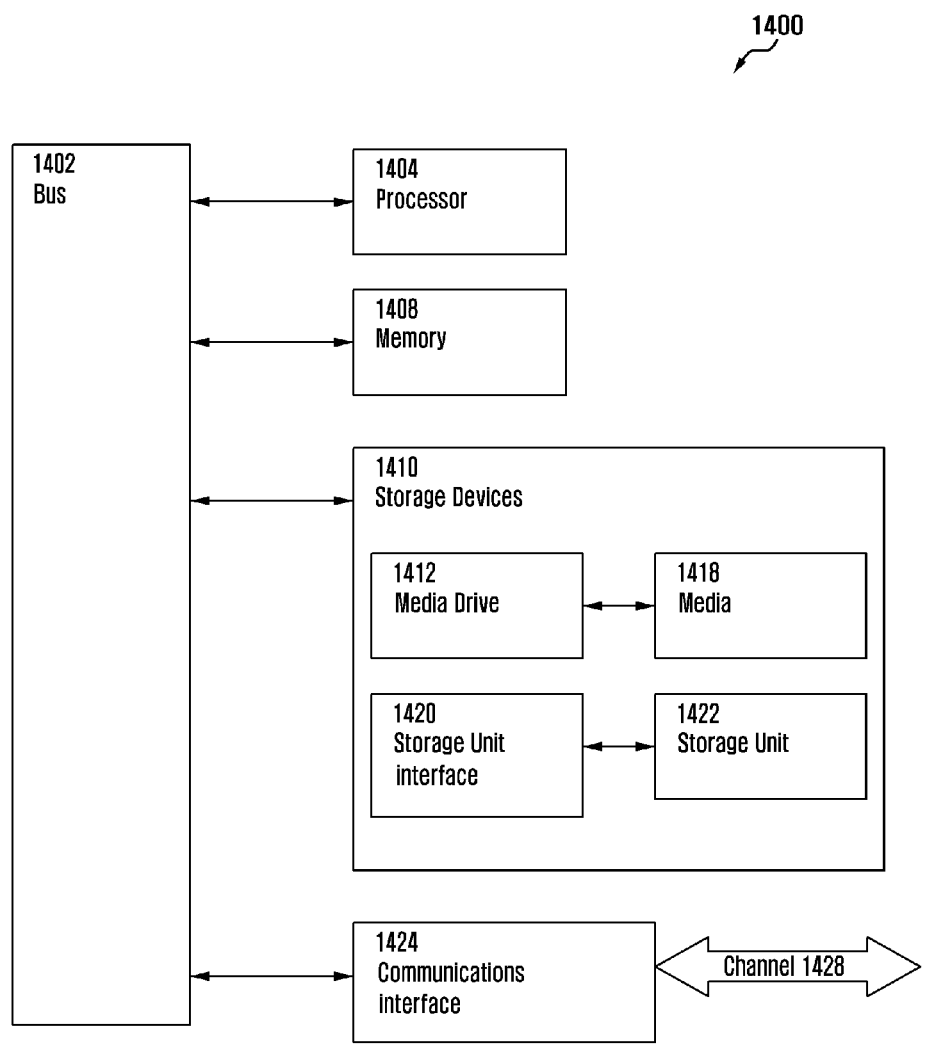

NETWORK ELEMENTS, INTEGRATED CIRCUITS AND METHODS FOR ROUTING CONTROL

TECHNICAL FIELD

The field of this invention relates to a network element, an integrated circuit and a method for routing control. The invention is applicable to, but not limited to, a network element and a method for opportunistic transparent routing control using a selective IP Traffic offload (SIPTO) route within an Evolved Universal Mobile Telecommunication System (UMTS) Terrestrial Radio Access Network (E-UTRAN).

BACKGROUND ART

Evolved Packet Core (EPC) is the Internet Protocol (IP)-based core network defined by the 3rd generation partnership project (3GPP) in Release-8 for use by long-term evolution (LTE) and other access technologies. The goal of EPC is to provide a simplified all-IP core network architecture to efficiently provide access to various services, such as the ones provided in IMS (IP Multimedia Subsystem). The 3GPP Evolved Packet Core provides a means by which a wireless communication/mobile device (referred to as User Equipment (UE) in 3GPP parlance) is able to access a Packet Data Network (PDN). The only means by which a UE can access a PDN in the present standard is by means of a PDN gateway (GW). This requires that traffic traverse the entire Evolved Packet Core (EPC) before reaching the PDN GW. An EPC consists essentially of a Mobility Management Entity (MME) and access-agnostic Gateways for routing of user IP datagrams. Currently a UE accesses a PDN by means of the EPC network (sometimes referred to as core network), via the PDN GW and an SGi interface.

Selective IP Traffic offload (SIPTO) is a known mechanism that provides a means by which a radio access node (for example an eNodeB (eNB) or a Home Node B or a Home eNodeB (H(e)NB)) is able to directly exchange IP data with external PDNs. FIG. 1 illustrates a first known mechanism 100 using SIPTO. Here, a UE 105 exchanges IP data with an external PDN 135 via EPC. The exchange of IP data 130 is made through an eNB or H(e)NB 120 and a server-gateway (S-GW) or PDN GW 125. The exchange of IP data 115 is switched from the eNB or H(e)NB 120 through a Gateway General Packet Radio System (GPRS) Support Node (GGSN) or PDN GW 110 coupled to the eNB or H(e)NB 120. The IP data is then directly exchanged with the external PDN 135.

FIG. 2 illustrates a second known mechanism 200 using SIPTO. Here, a UE 205 again exchanges IP data with an external PDN 235 via EPC. The exchange of IP data 230 is again made through a eNB or H(e)NB 220 and a server-gateway (S-GW) or PDN GW 225. Again, in contrast to the IP data exchange via EPC, the network may decide to use a direct SIPTO connection. Here, the exchange of IP data 215 is transferred through the eNB or H(e)NB 220 and a notational address translation (NAT) module and layer-3 router 210 coupled to the eNB or H(e)NB 220. The IP data is then directly exchanged with the external PDN 235.

Thus, in order to use SIPTO, the UE has needed to create an additional, dedicated PDN connection, in order to activate a switch to the SIPTO connection (termed a SIPTO 'breakout'). Hence, in essence, the UE must initiate the break out. Furthermore, there is no chance of mobility for connections from the SIPTO to any non-SIPTO access, or vice versa, unless Mobile IP is enabled on top of the 3GPP links (which is currently prohibited in Rel.9 of the 3GPP standard development). Finally, the SIPTO-breakout has to occur on demand, i.e. the UE must know that the correct conditions exist in order for SIPTO to be used and, thus, a stimulus needs to be received by the UE in order to enable the breakout to a use of a SIPTO PDN connection.

Despite the numerous above-mentioned limitations, such direct exchange of data between the UE and a PDN server using a SIPTO connection provides several benefits. For example, the direct exchange of data using SIPTO allows the Network Operator to be able to offload excess data traffic. In addition, in some cases, better performance for the end user may be achieved, for example in a Home network or an Enterprise network situation when the network that the end user connects to is physically close to the end user, or even attached to the radio access node. In some cases, SIPTO may also provide access to networks that otherwise cannot be reached, especially home networks (for example a Home eNodeB offering access to a home WLAN).

DISCLOSURE OF INVENTION

Technical Problem

Nevertheless, in addition to the aforementioned limitations, there are a number of inherent problems when using a SIPTO mechanism.

First, SIPTO access has been conceived of as requiring a separate PDN connection. This means that a UE will have to acquire a new IP address and start a new connection or modify an existing client connection to the target network. This requires upgrades of existing UEs and, in particular, of client software to support SIPTO, as the UE must become aware of the availability of SIPTO and perform specific actions to enable the breakout of its existing IP connection to use an alternative SIPTO connection.

Secondly, the accepted understanding is that using SIPTO for direct exchange of IP data will require a new IP address assignment, as a result of the additional PDN connection. Though IP address mobility could be possibly supported with some mechanisms, there are only three options that have thus far been considered. A first consideration is to possibly use a mobility anchor in the radio access mode—to thereby provide IP outbound mobility within radio coverage offered by the radio access node. This first consideration suffers from a need to force IP routes to trombone back to the edge of the Network Operator's network. Since the primary goal of SIPTO, at least from a Network Operator's perspective, is to off-load backhaul data traffic, this is a major disadvantage. A second consideration is to use mobile IP within the PDN to which both SIPTO and the PDN GW enable access. The IP address offered by the 3GPP system then becomes a 'care of address (CoA)' to be registered with the Mobile IP Home Agent in the PDN. This consideration is severely limited in its application, as Mobile IP over 3GPP accesses is forbidden in 3GPP Release 8 and Release 9; and thus only new terminals and core networks would be able to employ this mechanism. A third consideration is to provide no mobility support. Here, the UE loses any sessions that have been established when it moves to a SIPTO offload situation. As with the first consideration, in order to avoid user-experience problems, a significant change would be required in client software to 'hide' service discontinuity from the end user.

Thirdly, other possible approaches are likely to be complex and potentially imply significant additional cost. For example, one approach currently being discussed includes using many core network (CN) functions in the radio access node. However, this approach is unpopular with most mobile operators, as they fear this will raise the unit price of the SIPTO function. Another approach currently being discussed includes using NAT functions in the radio access node. However, this approach would complicate L3 related functions such as DNS, DHCP configuration, as well as application interactions. Thus, complex configuration and gateways would be necessary for any non-trivial deployment. This would preclude the solution for enterprise SIPTO service.

The previous problems also apply to the known mechanism of using notational address translation (NAT) to access external PDNs. In addition, adopting a NAT approach requires application layer gateways. Furthermore, NAT configuration requirements may well interfere with configuration services offered by the breakout network (especially using dynamic host configuration protocol (DHCP) techniques). In addition, use of NAT will interfere with proper operation of the domain name server (DNS). A yet further problem associated with a potential use of NAT is that it will be impossible to maintain the same IP address for the UE irrespective of whether the UE is using SIPTO or not. Hence, client-server sessions will be broken by interposing a NAT, even though new PDN connections will not be necessary.

Thus, a need exists for an improved network element, integrated circuit therefor and method for routing control.

Solution to Problem

Accordingly, the invention seeks to mitigate, alleviate or eliminate one or more of the above mentioned disadvantages singly or in any combination. Aspects of the invention provide a network element, an integrated circuit and a method for opportunistic transparent routing control as described in the appended claims.

According to aspects of the invention, there is provided a method, a core network element, an integrated circuit and a computer program code comprising code operable for identifying whether a selective internet protocol transport opportunity (SIPTO) route is allowed to be used by at least one wireless communication unit.

According to further aspects of the invention, there is provided a method, a core network element, an integrated circuit and a computer program code comprising code operable for determining whether a selective IP Traffic offload (SIPTO) is supported for routing IP data between an external packet data network and the wireless communication unit.

According to further aspects of the invention, there is provided a method, a network element, an integrated circuit and a computer program code comprising code operable for routing internet protocol (IP) data in a communication network that comprises a Network Operator's core transport network.

According to further aspects of the invention, there is provided a method, a network element, an integrated circuit and a computer program code comprising code operable for supporting SIPTO within a transport network layer (TNL) comprising an external packet data network (PDN) router.

In examples herein after described, a SIPTO approach (and in some instances an Opportunistic Transparent SIPTO approach) is described that is transparent to the operation of the wireless communication unit (or user equipment (UE)). Thus, and advantageously, the wireless communication unit does not require an additional PDN connection, nor does it require special UE client software to support. Further the SIPTO approach does not require a Release 10 UE to provide any additional special functions, nor does the wireless communication unit need to perform any mobility procedures. Advantageously, legacy wireless communication units will be supported by the described mechanisms. At least one described example is opportunistic, in that it can be employed when the opportunity arises, using exactly the same configuration. Mobility may be supported by means of manipulation of routing. In one example, a UE's mobility anchor may remain the PDN GW in the EPC irrespective of whether traffic is routed to or through it in the case of SIPTO. Advantageously, the SIPTO mechanisms described herein do not require use of network address translation (NAT), application level gateway, configuration-hiding or other functions. Advantageously, the SIPTO mechanisms described herein do not also require the introduction of core network (CN) functions to the radio access node.

These and other aspects of the invention will be apparent from, and elucidated with reference to, the embodiments described hereinafter.

Advantageous Effects of Invention

According to the present invention, a SIPTO approach (and in some instances an Opportunistic Transparent SIPTO approach) is described that is transparent to the operation of the wireless communication unit (or user equipment (UE)). Thus, the wireless communication unit does not require an additional PDN connection, nor does it require special UE client software to support. Further the SIPTO approach does not require a Release 10 UE to provide any additional special functions, nor does the wireless communication unit need to perform any mobility procedures.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIG. 3 illustrates an example of a network supporting IP data flow before and after SIPTO establishment.

FIG. 4 illustrates an example network supporting activation of an opportunistic transparent routing (OTR) for SIPTO.

FIG. 5 illustrates a network example of an OTR SIPTO deactivation mechanism.

FIG. 6 illustrates an example of Attach Procedure modifications to TS 23.401, 5.3.2.1.

FIG. 7 illustrates an example of IP address allocation based on a UEs location using SIPTO APNs.

FIGS. 8 and 9 illustrate an example of modifications to TS 23.401, 5.5.1.1.2 X2 based handover (with and without S-GW relocation) procedures.

FIG. 10 to FIG. 13 illustrate example modifications to E-UTRAN Inter-radio access technology (RAT) handover procedures FIG. 14 illustrates an example of an opportunistic transparent routing activation procedure.

FIG. 15 illustrates an example of an opportunistic transparent routing de-activation procedure.

FIG. 16 illustrates an example of a Network Operators core transport network topology.

FIG. 17 illustrates an example of enabling the optimised routing using MPLS TE mechanisms.

FIG. 18 illustrates a typical computing system that may be employed to implement signal processing functionality in embodiments of the invention.

MODE FOR THE INVENTION

Examples of the invention will be described in terms of an opportunistic and transparent mechanism for utilising a selective IP Traffic offload (SIPTO) thereby supporting direct exchange of IP data between a UE and an external PDN. In particular, a UE is able to access a PDN using a SIPTO connection by means of radio access node, such as an eNB, or H(e)NB, that is capable of performing SIPTO. The opportunistic and transparent routing control for SIPTO utilises a first router that is coupled to the radio access node and a second router that is located in the routing path of either the PDN network or the ISP Core, with knowledge that another route (via SIPTO) exists that bypasses the home (Operators core network transport) link. However, it will be appreciated by a skilled artisan that the inventive concept herein described may be embodied in any type of IP data network where different routing options can be employed.

Figure 1:
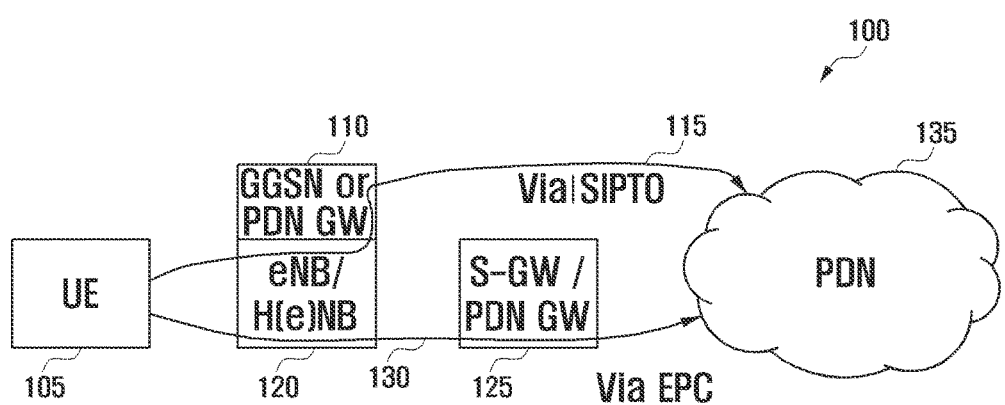
FIG. 1 illustrates a known direct IP data exchange employed in a radio access node using a GGSN or PDN GW and a SIPTO mechanism.
Figure 2:
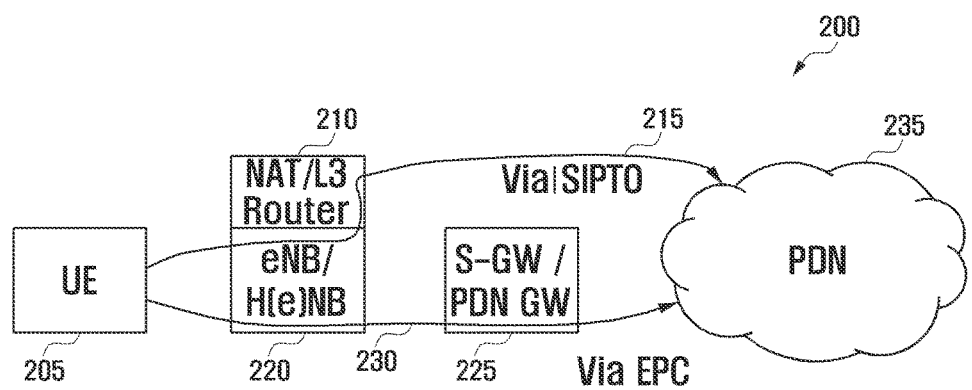
FIG. 2 illustrates a known direct IP data exchange employed in a radio access node using a NAT plus Router and a SIPTO mechanism.

Examples herein described enable the same PDN connection to be used between the UE and the external PDN, which is therefore more efficient than the solution illustrated in FIG. 1 that adds a GGSN or PDN GW to the radio access node. Furthermore, the examples herein described are advantageously transparent to the UE. Thus, the UE does not need to know that a SIPTO service exists, as the UE is able to access a PDN as defined in Release 99 of 3GPP and without any modification to the UE being required. Additionally, there is no need for client IP mobility support in the UE, for example in a form of Client MIP module, and yet still the client session can be preserved by means of manipulation/switch of the routing paths. This is in contrast to normal Mobile IP procedures that preserve a route to the UE by maintaining a forwarding path from the home link.

Examples herein after described detail a network element and a method for routing internet protocol (IP) data in a communication network that comprises a Network Operator's core transport network. The method (and associated modules within the network element) comprise, at a radio access node: receiving a request from a wireless communication unit to access an external packet data network (PDN); determining a location of the requesting wireless communication unit; and determining that a selective IP Traffic offload (SIPTO) opportunity exists for routing IP data between the external packet data network and the wireless communication unit in the determined location, in addition to an IP route via the Network Operator's core transport network. In response thereto, the method further comprises initiating an IP address allocation that later facilitates routing IP data between the wireless communication unit and the external PDN via the SIPTO route, bypassing Network Operator's core network; when activating the SIPTO route.

FIG. 3 illustrates an example of a network supporting IP data flow before and after SIPTO establishment. As shown, a network initially provides a first IP data flow 305 between the UE 315 and a server 345 in an external PDN 340 using the normal 3GPP architecture elements. For example, UE 315 is operably coupled to a radio access node 320, which in turn is operably coupled to a network entity in a form of a serving GPRS support node SGSN or mobility management entity 325 for control plane (C-plane) data flow 317, and SGSN or server gateway (S-GW) 330 for user plane (U-plane) data flow 318. The SGSN/MME 325 and the SGSN/S-GW 330 are both operably coupled to a GGSN or PDN-GW 335, which in turn is operably coupled to the external PDN server 345. However, the UE may move to a coverage area of a radio access node (eNB, H(e)NB) that offers SIPTO support, as illustrated in the second IP data flow network 310. Thus, the roamed-to network 310 may determine that SIPTO support is (a) allowed for the UE, (b) advantageous and (c) possible to the external PDN server 345 to which the UE 315 is connected. In this case, SIPTO should be considered an opportunity and initiated.

As shown, following an initiation of SIPTO, the roamed to network 310 provides a second IP data flow between the UE 315 and the external PDN server 345 via a radio access node 320. Notably, radio access node 320 is operably coupled to a first router 350 to support U-plane data flow 380, which in turn is operably coupled to a second router 355 operably coupled to the external PDN server 340 via a SIPTO connection. Notably, there is no change to the C-plane data flow, which still traverses the SGSN or MME 325 to the GGSN or PDN-GW 335. The second router 355 may be located within the external PDN 340, as shown, or located elsewhere in the SIPTO path 380. Thus, the IP data flow change requires a modification of routing behaviour within the radio access node 320 as well as to and from the PDN 340. Advantageously, the path to the target external PDN 340, though different, does not necessitate any change in the UE 315 or in the state or configuration of client software running in the UE 315.

Advantageously, legacy UEs are able to make use of SIPTO connections, such as SIPTO connection in FIG. 3.

Following establishment of the SIPTO connection, the UE may leave coverage of the radio access node that provides SIPTO access. Further, the opportunity that indicated the use of SIPTO may cease, or the UEs PDN connection may be terminated, etc. In either of these cases, the SIPTO session must be terminated, possibly with the PDN connection itself. Here, the functions controlling the SIPTO session should be able to determine (or be informed of) the change in status and clean up the state to return the IP data flow situation before SIPTO was established from the radio access node perspective.

Thus, in one example, SIPTO may be used to offload U-plane traffic from the CN, in order to optimise use of limited resources, and perhaps provide a gain in performance for the customer and even the PDN network operator. It is envisaged that the use of such a SIPTO connection should be under the mobile operator control.

In one example, the routing modification between the PDN server 345 and the second router 355 may be accomplished within the PDN 340 or in the transit network between the first router 350 and the PDN 340. In one example, if the second router 355 is located within the PDN 340, a collaborative agreement may exist between the mobile operator and the PDN operator, in order to exchange routing update information. For example, a mobile operator may have an agreement with an enterprise customer to provide routing update information when the UE 315 performs SIPTO to the enterprise network. The mobile operator may also have an agreement with a fixed operator. In this case, the mobile operator could exchange routing update information with the fixed operator when a SIPTO connection occurs. In either case, the IP data flow route between the first router 350 and the second router 355 is preferred to the route via the P-GW, at least while SIPTO is activated. Example architectures supporting the operation of the second router 355 are described later and illustrated in FIG. 16 and FIG. 17.

In one example, and referring back to FIG. 3, the first router 350 and second router 355 may be co-located within the same physical entity (for example, in the radio access node 320), to provide direct connection between entities within, say, a home network. Thus, in this example, only the PDN connection to the home network has its U-plane path switched, thereby allowing other PDN connections to access the core network, the (and other) PDN GW(s), etc. In one example, access control to provide a SIPTO connection may be only to authorized UEs, within limits set, say, by the Operator and given consent by the H(e)NB owner. Such authorisation may be controlled by entities within the core network.

In one example, a collaborative agreement may exist between the Operator, the transit network and the PDN network in order to instantiate the path switch that will enable the optimized path routing. In this example, messages may be transferred from the CN to activate SIPTO for initial and ongoing connections to the PDN. Furthermore, in this example, messages may also be transferred from the network to deactivate SIPTO when the PDN connection ceases or the UE moves to a new (target) radio access node. Thus, upon mobility away from the radio access node, messages may also be sent that can deactivate SIPTO either from the eNB, H(e)NB or the core network MME. Thus, these conditions constitute a trigger for interaction between the first router 350 in the radio access node and the second router 355 in the PDN 340, thereby deactivating the SIPTO connection and causing an effective path switch back to use of the Network Operators core network. Furthermore, the trigger also initiates a clean up operation within the PDN 340 that will update the routing path towards the Operators core network. Also, the radio access node may be configured to determine whether a SIPTO opportunity exists to assist a resource bound situation, for example based upon a S1 resource exhaustion message. The radio access node may also be able to inform the PDN that SIPTO has been activated, in order that the second router may be configured to receive and transmit IP data flow to/from the radio access node. Finally, in such a collaborative mode, the routing state establishment and clean up in the PDN network, or the ISP transit network to the PDN network, to support SIPTO connectivity must be possible to be controlled from the eNB, H(e)NB, the MME or the external PDN, depending on the different conditions that might trigger the opportunity for SIPTO.

Currently, a PDN connection is created either by means of an Initial Attach message or a UE initiated Additional PDN Connection procedure from the E-UTRAN, or by means of a PDP Context Activation. In each case, there is a message returned to the eNB/H(e)NB. In some examples of the present invention, these messages are adapted to additionally comprise a control message to activate and authorize SIPTO. Similarly, upon handover to the eNB/H(e)NB, information is sent that indicates whether or not a SIPTO connection should be established, as described later.

Referring now to FIG. 4, a further example network that supports activation of an opportunistic transparent routing (OTR) for SIPTO is illustrated. As shown, a network provides a variety of IP data flows 405, 410 between the first and second UEs 415, 417 and external PDNs 440, 438 using the normal 3GPP architecture elements. For example, first UE 415 is wirelessly coupled to first radio access node 420, in the form of a H(e)NB or macro eNB capable of performing opportunistic 'internet offload. The first radio access node 420 is operably coupled to a first router 450 of a first internet service provider (ISP-1) 422. The network supports a first IP data flow with a non-optimised routing path 470. Here, ISP-1 450 is coupled to a 3GPP network entity in a form of a GGSN or PDN-GW 435, which in turn is operably coupled to a firewall or proxy entity 442 via an Operator specific IP network 441. The firewall or proxy entity 442 is operably coupled to a first external PDN 440 via a second router 455.

The network also supports a second IP data flow using an optimised routing path 480, with SIPTO being activated. Thus, macro-cell eNB 420 may be aware that it is authorised to perform an internet offload for the first UE, for a particular PDN connection to the first PDN 440. Thus, if macro eNB 420 has sufficient configuration capabilities to bring up an internet offload 'tunnel/connection' from the first router 450, determines that a collaborating router in the first PDN 440 exists, for example second router 455 and determines that SIPTO support is allowed for the first UE 415, a SIPTO connection may be considered and activated to the external PDN server 440 to which the UE 415 is connected. In this case, a direct SIPTO connection using an optimised routing path 480 between first router 450 and second router 455 should be considered an opportunity and initiated. In one example, this does not require that the eNB 420 itself has to be aware of the different PDN connections of the UE 415, but only which of the EPS bearers are authorized to use SIPTO and for which the eNB is able to access a PDN directly.

In one example, the collaborating second router 455 enables a better routing path to the first UE's IP address, as illustrated with respect to FIG. 16 and FIG. 17, than a routing path through the operators network and over the SGi interface. User plane traffic (uplink and downlink) between the first UE 415 and the first PDN 440 will traverse the SIPTO IP termination reference point, between the eNB, H(e)NB and the packet data network that is used for the traffic offload (i.e. backhaul) when the Opportunity for SIPTO occurs. It is noteworthy that until the optimized routing path has started to be used to the whole network, some traffic may continue to be sent to the first UE 415 by means of the SGi interface.

In one example, the second router 455 is located within the first PDN 455, as depicted, where the mobile operator exchanges routing information with the PDN operator. Alternatively, in a further example, the second router 455 is located within the transit network between the first eNB 420 and the PDN 440, where the mobile operator exchanges routing information with the transit network operator.

Similarly, for completeness, the second UE 417 is wirelessly coupled to second radio access node 419, in the form of a H(e)NB or eNB. The second radio access node 419 is operably coupled to a third router 452 of a second internet service provider (ISP-2) 423. Thus, the network supports a third IP data flow with a non-optimised routing path 475. here, ISP-2 423 is coupled to the 3GPP network entity in the form of the GGSN or PDN-GW 435, which in turn is operably coupled to a firewall or proxy entity 442 via an Operator specific IP network 441. The firewall or proxy entity 442 is also operably coupled to a second external PDN 438 via a fourth router 457.

In a similar manner, the network also supports a fourth IP data flow using an optimised routing path 485, with SIPTO being activated. Thus, the network 410 may determine that SIPTO support is (a) allowed for the second UE 417, (b) advantageous and (c) possible to the external PDN server 438 to which the UE 417 is connected. In this case, a direct SIPTO connection using an optimised routing path 485 between third router 452 and fourth router 457 should be considered an opportunity and initiated.

Advantageously, neither the first nor second UE 415, 417 need know that the breakout to the direct SIPTO connection occurs. In addition, neither the first UE 415 nor second UE 417 needs to be adapted to support such a SIPTO connection, as the determination of whether or not to use a direct SIPTO connection is initiated by the respective radio access node (eNB or H(e)NB) 420, 419.

Once an OTR SIPTO connection has been activated, the SIPTO connection needs to be carefully de-activated at some stage. Referring now to FIG. 5, a network example following the OTR SIPTO deactivation 500 is illustrated. As shown, the second router now routes the traffic towards the P-GW following a de-activation of the SIPTO.

As previously mentioned, there are several conditions that may cause deactivation of the SIPTO connection (optimised) routing path, for example the UE may no longer be authorized to use SIPTO or the 'overload' conditions may no longer apply for SIPTO. Alternatively, the SIPTO connection may need to be deactivated when the UE moves out of coverage of its serving eNB or H(e)NB that offers the breakout, or the SIPTO tunnel/connection/route is torn down by the router, e.g. first router 450 of FIG. 4. In any of the above, following de-activation of the SIPTO route, the second router forwards all DL traffic intended for the UE to the PDN GW (for example via SGi) and ceases to use the preferred OTR SIPTO routing path in the PDN. All DL traffic from the PDN for the UE will then be sent by way of SGi.

In one example, a set of policies may be applied to determine whether OTR SIPTO should be activated. For example, one or more of the following determinations may be made:

(i) Does the Network Operator allow a given wireless communication unit (UE) to access SIPTO (per a given PDN)? In this example, a new field may be included within the HSS subscriber profile to indicate whether the wireless communication unit (UE) does have access to SIPTO (per a given PDN).

(ii) Does the Network Operator allow a given H(e)NB or eNB to break out to using SIPTO (per a given PDN)? Here, the MME is configured to control the H(e)NB or eNB operation and make this determination, and informs the eNB or H(e)NB whether SIPTO is allowed, for example within an information element (IE) sent within the Attach procedure illustrated in FIG. 6, as described below.

(iii) Does the owner of the H(e)NB allow it to break out (per a given APN), where this is configured within the H(e)NB?

Referring now to FIG. 6, an example 600 of modifications to the Attach Procedure of TS 23.401, 5.3.2.1 is illustrated, in order to pass the actual authorization information to the eNB or H(e)NB. As illustrated, the modified MME sends an Attach Accept (comprising APN, GUTI, PDN Type, PDN Address, TAI List, EPS Bearer Identity, Session Management Request, Protocol Configuration Options, KSIASME, NAS sequence number, NAS-MAC, IMS Voice over PS session supported Indication, Emergency Service Support indicator, and notably a SIPTO Allowed Indicator) message 605 to the eNodeB. In this manner, the MME sets the SIPTO Allowed indicator to TRUE only when the UE subscription policy includes a SIPTO-Allowed parameter set to TRUE for the connected APN and the operator policy allows the eNB to perform activate SIPTO. Otherwise the SIPTO Allowed indicator is set to FALSE. The eNB receiving a SIPTO Allowed indicator set to TRUE, within the Attach Accept message 606, may perform SIPTO handling of the user plane, as described in section later. A similar modification may be applied to section 5.10.2 with regard to the UE requested PDN connectivity, within the Bearer Set-up Request/Connectivity Accept message.

Referring now to FIG. 7, an example flowchart 700 of a mechanism to allocate an IP address based on a UEs location using SIPTO APNs is illustrated. In order for the P-GW/GGSN to allocate an IP address that will be in the routing path that will enable SIPTO (if the opportunity occurs), the SIPTO Allowed Indicator may have to also reach the P-GW within, say, the Attach/PDN Connectivity procedure. This should allow the operator the ability to allocate IP addresses (e.g. following mechanisms described in TS 29.061: Interworking between PLMN supporting packet based services and PDNs) from a special range that would allow the PDN or the transit IP network to subsequently establish optimized routing paths, if the opportunity for SIPTO arises.

The example illustrated in FIG. 7 utilises a determination of the UEs location when it connects and indicates the location to the P-GW/GGSN, as shown in step 705. Thus, for example, the MME will send network information to the P-GW/GGSN to determine what target network to employ TS 29.061 procedures with. In this regard, the MME is configured to know that for APN x, from eNB y, the PDN is z. In this manner, the P-GW/GGSN is able to derive the desired IP address of the ISP PDN z that serves the backhaul operation of the H(e)NB or eNB as shown in step 710. The P-GW/GGSN is then able to allocate an IP address to the UE from a specific range that would allow SIPTO to be used when the opportunity occurs, as in step 715. The allocated IP address relates to a PDN connection that can be routable to/from the ISP to support OTR SIPTO operation.

In one example, where a PGW or GGSN is located within the H(e)NB or eNB, the aforementioned flowchart ensures that the SIPTO breakout address is the ideal candidate for the breakout network (especially the internet breakout scenario, where the corresponding node could be on any network in the publicly accessible internet). For a NAT-based approach, one single address may be used to hide several UEs. However, the NAT still has to obtain this single address, and, for this, 29.061 procedures are still applied for the reasons given above. Hence, the example illustrated in FIG. 7 is backward compatible to existing SIPTO solutions.

Referring now to FIG. 8 and FIG. 9 examples of modifications to TS 23.401, 5.5.1.1.2 X2 based handover with serving GW relocation 800 and handover without S-GW relocation 850 procedures are illustrated. In the example modification TS 23.401, 5.5.1.1.2 X2 based handover with serving GW relocation 800 the MME confirms the Path Switch Request message with the Path Switch Request Ack message 805 (which comprises Serving GW addresses and uplink TEID(s) for user plane, and notably a SIPTO Allowed Indicator). In one example, if the UE-AMBR is changed, for example indicating that all the EPS bearers that are associated to the same APN are rejected in the target eNodeB, the MME provides the updated value of UE-AMBR to the target eNodeB in the Path Switch Request Ack message 805. The target eNodeB then starts using the new Serving GW address(es) and terminal equipment Identifiers (TEID(s)) for forwarding subsequent uplink packets. In this example, the MME sets the SIPTO Allowed indicator to TRUE only when the UE subscription policy includes a SIPTO-Allowed parameter set to TRUE for the connected APN and the operator policy allows the eNB to perform activate SIPTO, as previously described. Otherwise the SIPTO Allowed indicator is set to FALSE. If some EPS bearers have not been switched successfully in the core network, the MME indicates in the Path Switch Request Ack message 805 those EPS bearers that failed to be established and may initiate the bearer release procedure to release the core network resources of the failed EPS bearers. The target eNodeB then deletes the corresponding bearer contexts, when it is informed that EPS bearers have not been established in the core network.

In the example modification TS 23.401, 5.5.1.1.2 X2 based handover without serving GW relocation 850 the MME the Target MME sends a Handover Request message 855 (comprising EPS Bearers to Setup, AMBR, S1AP Cause, Source to Target transparent container, Handover Restriction List, and notably a SIPTO Allowed Indicator) to the target eNB. The Handover Request message 855 creates the UE context in the target eNB, including information about the bearers, and the security context. For each EPS Bearer, the Bearers to Setup include the Serving GW address and uplink TEID for user plane, and EPS Bearer QoS. A Handover Restriction List may also be sent, if available in the Target MME. The MME sets the SIPTO Allowed indicator to TRUE only when the UE subscription policy includes a SIPTO-Allowed parameter set to TRUE for the connected APN and the operator policy allows the eNB to perform activate SIPTO. Otherwise the SIPTO Allowed indicator is set to FALSE.

The eNB receiving a SIPTO Allowed indicator set to TRUE may perform SIPTO handling of the user plane. Here, an S1AP Cause indicates the RAN Cause as being received from source MME. The target eNB then sends a Handover Request Acknowledge message (comprising an EPS Bearer Setup Result, Target to Source transparent container) to the target MME. The EPS Bearer Setup Result includes a list of rejected EPS bearers and a list of addresses and TEIDs allocated at the target eNB for downlink traffic on S1-U reference point (one TEID per bearer) and addresses and TEIDs for receiving forwarded data if necessary. If the UE-AMBR is changed, for example indicating that all of the EPS bearers that are associated to the same APN are rejected in the target eNB, the MME recalculates the new UE-AMBR and signals the modified UE-AMBR value to the target eNB.

In a similar manner to the aforementioned examples of modifications to TS 23.401, 5.5.1.1.2 X2 based handover with serving GW relocation 800 and handover without S-GW relocation 850 procedures of FIG. 8 to FIG. 13 illustrate example modifications to E-UTRAN Inter-radio access technology (RAT) handover procedures. For example, in a handover request according to Section 5.5.2.2.2 in UTRAN Iu mode to E-UTRAN Inter-RAT handover 900, a modified handover request 905 is used. Similarly, for example, in a handover request according to Section 5.5.2.4.2 in GERAN A/Gb mode to E-UTRAN Inter-RAT handover 910, a modified handover request 915 is used. Similarly, for example, in a handover request according to D3.4 in 3G SGSN to MME combined hard handover and SRNS relocation procedures 920, a modified handover request 925 is used. Similarly, for example, in a handover request according to D3.8.2 in GERAN A/Gb mode to E-UTRAN Inter-RAT handover 930, a modified handover request 935 is used.

Referring now to FIG. 14 an example of an opportunistic transparent routing activation procedure 1000 is illustrated. The signal flow comprises signalling between a UE 1015, a network element in a form of an eNB or first router 1020, a second (remote) router 1055, a MME 1025, a serving GW 1030 and a PDN GW 1040. The eNB or first router 1120 has an established user plane communication between the UE 1015 and the PDN GW 1040 via the second router 1055, as shown in signal flows 1070, 1072, 1074, 1076. In step 1078, a SIPTO IP termination reference point tunnel, connection or required routing state is established between the first router 1020 and the second (remote) router 1055, following activation of a SIPTO opportunity. In step 1080, once the SIPTO IP termination reference point tunnel is established, the eNB or first router 1020 determines that it should switch paths and, thus, commences SIPTO routing. Furthermore, the MME 1125 is informed, in signal flow 1082, by the eNB or first router 1020 of the impending path switch due to SIPTO activation via the S1 interface. The MME 1025 may acknowledge this information to the eNB or first router 1020, as shown in signal flow 1084. Alternatively, in one example, the MME 1025 may reject the path switch and remove authorization from the eNB 1020 to perform SIPTO at this point. In the former case, the path is then switched so that the user plane uses SIPTO from the eNB 1020 to the PDN GW 1040 direct via the second router 1055, as shown in signal flows 1086, 1088, 1090.

Activation of OTR SIPTO is termed opportunistic because it only occurs as an optimization, for example to offload traffic. For example, some load conditions could indicate that offload is required. The Network Operator, in such a case, may be able to "turn on" SIPTO for a number of cells that are served by certain eNBs using known Operations and Management (O&M) mechanisms. Another example is the use of SIPTO in the enterprise environment, where SIPTO may be enabled only for specific UEs belonging to the enterprise (for example on a subscription basis) whereas other visitors to the enterprise will use the same H(e)NB without their UE's being able to benefit from the available OTR SIPTO support.

Advantageously, activation of OTR SIPTO is transparent to the UE, as the UE does not need to know that it has occurred. Thus, the UE requires no special support for this function nor does it activate any specific PDN connection, etc. in order to obtain this service. The described OTR SIPTO mechanism makes use of a routing module located within the eNB or H(e)NB.

In accordance with one example implementation, a new clause for TS 23.401 of the 3GPP standard is represented below:

4.X. Opportunistic Transparent Routing selective IP Traffic offload

4.X.1 General

4.X.2 Opportunistic Transparent Routing Activation

An eNB may provide Opportunistic Transparent Routing of the user plane traffic to a target PDN directly, without employing the core network user plane. This is shown in Figure 4.X.2-1

The UE remains unaware of the user plane handling of the PDN connection. The activation occurs when the following conditions are met:

The eNB receives a SIPTO Allowed Indicator from the MME set to TRUE

The eNB fulfills an operator defined condition to activate SIPTO (e.g. a threshold of load on S1-U)

The UE is in ECM-CONNECTED state

FIG. 15 illustrates an example of a signal flow of an opportunistic transparent routing de-activation procedure 1100. In the example signal flow, deactivation of OTR SIPTO may occur upon any one or more of the following conditions arising:

(i) The UE moves out of coverage of the eNB/H(e)NB that is supporting OTR SIPTO;

(ii) Following a PDN deactivation/detach event;

(iii) The 'opportunity' that instigated the transition to OTR SIPTO (such as, e.g. excessive traffic load) is determined as no longer applying;

(iv) Handover to a new target eNB/H(e)NB or following a non-3GPP access/3GPP access;

(v) The UE transitions into IDLE mode; or (vi) Instead of the not deactivating the OTR SIPTO connection when the UE transitions to IDLE mode, the eNB may take action to initiate paging of the UE. In this scenario, the eNB may send an uplink zero data length loopback IP packet to the UE by, say, means of an S1-U interface towards the PDN GW. This packet will be sent back to the UE from the PDN GW. When the packet arrives at the S-GW paging will be triggered, as normal.

The signal flow comprises signalling between a UE 1115, a network element in a form of an eNB or first router 1120, a second (remote) router 1155, a MME 1125, a serving GW 1130 and a PDN GW 1140. The eNB or first router 1120 has an established user plane communication between the UE 1115 and the PDN GW 1140 via the second router 1155, as shown in signal flow 1170. In step 1180, the eNB or first router 1120 determines that it should switch paths and, thus, cease SIPTO routing. In one example, this switch may be triggered by, say, the lack of an opportunity condition (for example, the load on S1 may have decreased below a threshold), or the PDN connection may be deactivated, or the UE may handover to another access node, etc. Thereafter, the eNB or first router 1120 terminates the SIPTO IP termination reference point tunnel/connection/routing state that enabled the communication between itself and the second router 1155, as shown in signal flow 1181. The second router 1155 then signals the PDN GW 1140 of the de-activation to ensure that downlink (DL) traffic from the PDN GW 1140 to the UE 1115 is forwarded along the new path to the PDN GW 1140, if possible. Furthermore, the MME 1125 is informed, in signal flow 1185, by the eNB or first router 1120 of the impending path switch from SIPTO routing to normal routing via the S1 interface to the PDN GW 1140. The MME 1125 may acknowledge this information to the eNB or first router 1120, as shown in signal flow 1187. The path is then switched from SIPTO to route the user plane by way of the PDN GW 1150 instead of direct via the second router 1155 to the PDN GW 1140, as shown in signal flows 1186, 1188, 1190, 1192.

In an alternative example, signal flow 1185 and signal flow 1187 may occur after the establishment of the normal (non-SIPTO) route as it will be rare for the MME to decline the transition away from the SIPTO route.

In this manner, the example signal flow describes a mechanism that provides an OTR deactivation procedure.

Referring now to FIG. 16, an example of a Network Operators core transport network topology 1200 is illustrated, for example configured to enable the opportunistic routing path optimisation for SIPTO in the Operators IP backbone. Thus, the example illustrated in FIG. 16 provides one exemplary architecture for supporting communications between the second router 355 and the PDN server 345 of FIG. 3. The network topologies at any Network Operators core, commonly referred to as an IP Transport Network Layer (TNL), are designed to provide substantial path diversity between backbone nodes in the providers points of presence (POPs). Within the POPs, backbone nodes are connected to public and/or private peering (with other internet service providers (ISPs), for example ISP-1 1202, ISP-2, 1212 and ISP-3 1222), provider data centres (for high volume traffic), and large (sophisticated) corporate customers. Determination of routing between these networks at peering points, for example ISPs 1202, 1212, 1222 and the Operators Core TNL 1250 is normally controlled by external BGP (E-BGP) route admission policies 1206, 1216, 1226. The BGP peering between ISPs is called external and the BGP peering within a providers network is called internal. Within the providers core 1250, internal BGP 1252, 1254 have rigid requirements for exchanging routing information amongst the peers, for example routers 1208, 1218, 1228, 1238. Internal BGP routers are configured to peer with each other normally in a complete mesh. Within the Operators core TNL 1250, the shortest paths are determined with either OSPF or IS-IS depending on the network topology.

As illustrated in FIG. 16, there are various possibilities in terms of how the routing path optimization may be enabled, for example by triggering a routing path switch 1260 located inside the IP backbone, when the opportunity for SIPTO occurs. In a practical Operator network, the selection of a particular routing path will be dependent upon a number of factors, for example the network topology, interconnection between the SIPTO IP breakout network and the architecture of the Operators backbone network.

The routing path optimisation modification between an external party and the second router, say second router 455 or second router 457 of FIG. 4, maybe accomplished within the PDN or in the transit network between the first router and the PDN. If the second router is located within the PDN, there should be a collaborative agreement between the mobile operator and the PDN operator, to exchange routing update information.

In a first example routing operation, the collaborating second router is configured to advertise within the Autonomous System (AS) that consists of the Packet Data Network (PDN) a better routing metric when the opportunity for SIPTO appears. In one example, the advertising may be performed using OSPF or IS-IS protocol, for example in a scenario where the eNB/HeNB is on the same AS as the IP network that connects to external PDNs and ISPs that provide connectivity to the Internet backbone. Thus, for relatively simple deployments, where the eNB/HeNBs are directly connected to a network that is managed and controlled by a single operator, the use of OSPF or IS-IS protocol may be used.

However, in a large scale deployment, the cost metric associated with OSPF and IS-IS may be too simplistic a modality for traffic engineering to be used, as using a shortest path route selection process, together with cost factors, in isolation may lead to significant imbalances in path loading. This is especially the case when various interconnections are available between the Operators IP backbone and external peering partners, in a form of ISPs offering service to the Internet backbone and/or their own networks where the eNB/HeNB will be connected. In such large scale deployments, optimised routing may be performed using MPLS TE mechanisms, as illustrated in FIG. 17.

Referring now to FIG. 17, an optimised routing architecture 1300 using MPLS TE mechanisms is illustrated. MPLS based traffic engineering (TE) is a commonly used mechanism in large scale backbone networks in order to emulate the virtual-circuits obtained normally from ATM, but without the signalling overhead associated with establishing the route/circuit and subsequently tearing the route/circuit down, as illustrated in RFC2702 Requirements for traffic engineering over MPLS. Thus, MPLS traffic engineering uses circuits carrying MPLS traffic that are often referred to as traffic trunks and can be routed independently of the underlying link topology.

Traffic Engineering with MPLS has the following components:

(i) IGP component which is composed of traffic engineering extensions to IS-IS and OSPF; and (ii) Signalling component which is based on traffic engineering extensions to RSVP or CR-LDP.

Traffic Engineering uses MPLS to construct paths through the managed IP core. The actual path selection is performed using a specialized database 1345 contained on each Label Switching Router (LSR), for example ingress LSR 1342. The specialised database 1345 is sometimes referred to as the traffic engineering link state database (TE-LSDB). The TE-LSDB 1345 contains the network topology of the core (bounded by a single IGP area). After the constraints are provided for path selection (for example egress, desired path, bandwidth, and inclusion/exclusion of label switching router interfaces), the TE-LSDB 1345 is pruned of non-compliant links and the shortest label switched path is selected.

Thus, the example illustrated in FIG. 17 provides one exemplary MPLS and traffic engineering architecture 1300 for establishing tunnels between all external BGP routers (for example first router 1308 within ISP TN 1306, second router 1350 within the target PDN 1352 and third router 1320 within the Operators packet bearer network 1314) and a single providers/Network Operators core backbone 1332 (bounded by a single AS). The selection of prefixes, in the application of short-cut routing, is referred to as the FEC (Forward Equivalence Class) and is predetermined by the external BGP NEXT HOP routes 1346, which are directly accessible by any of the egress routers 1326, 1330 or 1340.

Using for example the fast reroute mechanism described in RFC4090 Fast re-route extensions to RSVP-TE for LSP tunnels, each LSR that is in the path of the PDN that allows SIPTO, for example egress LSR-2 1330 and egress router 1340 in FIG. 17, will require the creation of a backup label switched path using the mechanisms described in RFC4090 for each primary label switched hop for any given LSP tunnel. The backup label switched path can provide the appropriate routing path for when the opportunity for SIPTO occurs The establishment of the backup Label Switched Path is the responsibility of a midpoint label switching router that would need to use the signalling extensions provided in RSVP-TE and contained in RFC4090 Fast reroute extensions to RSVP-TE for LSP tunnels to carry the appropriate priorities to each midpoint label switching router. Assuming the midpoint label switching router is informed of the capability for SIPTO, it can then determine the backup path consistent with the traffic engineering policy expressed at the Ingress Label Switching Router for the case that SIPTO is used or not.

Although examples of the invention have been described with reference to OTR SIPTO opportunities, it is envisaged that the examples equally apply to all SIPTO mechanisms, whether or not opportunistic transparent routing is used.

Although examples of the invention have been described with reference to LTE/EPC networks, it is envisaged that, for alternative applications, the inventive concept may equally be applied to any Universal Mobile Telecommunicaton System (UMTS) cellular communication system or general packet radio system (GPRS) and, indeed, applicable to any 3GPP Radio Access Technology. In some examples, some or all of the steps illustrated in the flowchart may be implemented in hardware and/or some or all of the steps illustrated in the flowchart may be implemented in software.

Referring now to FIG. 18, there is illustrated a typical computing system 1400 that may be employed to implement signal processing functionality in embodiments of the invention. Computing systems of this type may be used in access points and wireless communication units. Those skilled in the relevant art will also recognize how to implement the invention using other computer systems or architectures. Computing system 1400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1400 can include one or more processors, such as a processor 1404. Processor 1404 can be implemented using a general or special-purpose processing engine such as, for example, a microprocessor, microcontroller or other control module. In this example, processor 1404 is connected to a bus 1402 or other communications medium.

Computing system 1400 can also include a main memory 1408, such as random access memory (RAM) or other dynamic memory, for storing information and instructions to be executed by processor 1404. Main memory 1408 also may be used for storing temporary variables or other intermediate information during execution of instructions to be executed by processor 1404. Computing system 1400 may likewise include a read only memory (ROM) or other static storage device coupled to bus 1402 for storing static information and instructions for processor 1404.

The computing system 1400 may also include information storage system 1410, which may include, for example, a media drive 1812 and a removable storage interface 1420. The media drive 1412 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1418 may include, for example, a hard disk, floppy disk, magnetic tape, optical disk, CD or DVD, or other fixed or removable medium that is read by and written to by media drive 1412. As these examples illustrate, the storage media 1418 may include a computer-readable storage medium having particular computer software or data stored therein.

In alternative embodiments, information storage system 1810 may include other similar components for allowing computer programs or other instructions or data to be loaded into computing system 1400. Such components may include, for example, a removable storage unit 1422 and an interface 1420, such as a program cartridge and cartridge interface, a removable memory (for example, a flash memory or other removable memory module) and memory slot, and other removable storage units 1422 and interfaces 1420 that allow software and data to be transferred from the removable storage unit 1418 to computing system 1400.

Computing system 1400 can also include a communications interface 1424. Communications interface 1424 can be used to allow software and data to be transferred between computing system 1400 and external devices. Examples of communications interface 1424 can include a modem, a network interface (such as an Ethernet or other NIC card), a communications port (such as for example, a universal serial bus (USB) port), a PCMCIA slot and card, etc. Software and data transferred via communications interface 1424 are in the form of signals which can be electronic, electromagnetic, and optical or other signals capable of being received by communications interface 1424. These signals are provided to communications interface 1424 via a channel 1428. This channel 1428 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms computer program product, computer-readable medium and the like may be used generally to refer to media such as, for example, memory 1408, storage device 1418, or storage unit 1422. These and other forms of computer-readable media may store one or more instructions for use by processor 1404, to cause the processor to perform specified operations. Such instructions, generally referred to as computer program code (which may be grouped in the form of computer programs or other groupings), when executed, enable the computing system 1400 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1400 using, for example, removable storage drive 1422, drive 1412 or communications interface 1424. The control module (in this example, software instructions or computer program code), when executed by the processor 1404, causes the processor 1404 to perform the functions of the invention as described herein.

In particular, it is envisaged that the aforementioned inventive concept can be applied by a semiconductor manufacturer to any integrated circuit comprising IP routing capabilities. It is further envisaged that, for example, a semiconductor manufacturer may employ the inventive concept in a design of a stand-alone device, such as a signal processing module arranged to support SIPTO, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to a, an, first, second, etc. do not preclude a plurality.

Thus, an improved radio access node network element, integrated circuit and method for routing internet protocol (IP) data using SIPTO have been described, wherein the aforementioned disadvantages with prior art arrangements have been substantially alleviated.

The invention claimed is:

1. A method by a core network element in a wireless communication network, the method comprising:
 acquiring, from a home subscriber server (HSS), subscription information indicating whether a selected internet protocol traffic offload (SIPTO) is allowed for a user equipment;
 obtaining information on access point name (APN);
 identifying whether the SIPTO is allowed for the user equipment based on the subscription information and the information on the APN for a packet data network (PDN); and
 providing a SIPTO service to the user equipment if the SIPTO is allowed,
 wherein internet protocol (IP) traffic for the SIPTO service is transmitted to the user equipment without a user plane traversing a network operator's network.

2. The method of claim 1, wherein the subscription information for the user equipment includes a field indicating whether the SIPTO is allowed.

3. The method of claim 1, wherein a packet for the user equipment is transferred either by passing through a PDN gateway or without passing through the PDN gateway, if the SIPTO is allowed for the user equipment.

4. The method of claim 1, further comprising:
if the SIPTO is allowed for the user equipment, selecting a PDN gateway for allocating internet protocol (IP) address for the user equipment based on location information of the user equipment.

5. A core network element in a wireless communication network, the core network element comprising:
a processor;
a transceiver configured to transmit and receive a signal; and
a bus operatively connecting the processor and the transceiver,
wherein the processor is configured to execute a signal processing module arranged to:
acquire, from a home subscriber server (HSS), subscription information indicating whether a selected internet protocol traffic offload (SIPTO) is allowed for a user equipment,
obtain information on access point name (APN),
identify whether the SIPTO is allowed for the user equipment based on the subscription information and the information on APN for a packet data network (PDN), and
provide a SIPTO service to the user equipment if the SIPTO is allowed, and
wherein internet protocol (IP) traffic for the SIPTO service is transmitted to the user equipment without a user plane traversing a network operator's network.

6. The core network element of claim 5, wherein the subscription information for the user equipment includes a field indicating whether the SIPTO is allowed.

7. The core network element of claim 5, wherein a packet for the user equipment is transferred either by passing through a PDN gateway or without passing through the PDN gateway, if the SIPTO is allowed for the user equipment.

8. A method by a core network element, the method comprising:
acquiring subscription information indicating whether a selected internet protocol traffic offload (SIPTO) is allowed for a user equipment; and
providing the acquired subscription information to a mobility management entity (MME),
wherein whether the SIPTO is allowed for the user equipment is identified based on the subscription information and information on access point name (APN) for a packet data network (PDN), and
wherein internet protocol (IP) traffic for the SIPTO is transmitted to the user equipment without a user plane traversing a network operator's network, if the SIPTO is allowed.

9. The method of claim 8, wherein a packet for the user equipment is transferred either by passing through a PDN gateway or without passing through the PDN gateway, if the SIPTO is allowed for the user equipment.

10. The method of claim 8, further comprising:
if the SIPTO is allowed for the user equipment, a PDN gateway for allocating internet protocol (IP) address for the user equipment is selected based on location information of the user equipment.

11. A core network element in a wireless communication network, the core network element comprising:
a processor;
a transceiver configured to transmit and receive a signal; and
a bus operatively connecting the processor and the transceiver,
wherein the processor is configured to execute a signal processing module arranged to:
acquire subscription information indicating whether a selected internet protocol traffic offload (SIPTO) is allowed for a user equipment, and
provide the acquired subscription information to a mobility management entity (MME),
wherein whether the SIPTO is allowed for the user equipment is identified based on the subscription information and information on access point name (APN) for a packet data network (PDN), and
wherein internet protocol (IP) traffic for the SIPTO is transmitted to the user equipment without a user plane traversing a network operator's network, if the SIPTO is allowed.

12. The core network element of claim 11, wherein a packet for the user equipment is transferred either by passing through a PDN gateway or without passing through the PDN gateway, if the SIPTO is allowed for the user equipment.

* * * * *